United States Patent
Okamoto et al.

(10) Patent No.: US 6,430,382 B1
(45) Date of Patent: Aug. 6, 2002

(54) IMAGE FORMING APPARATUS WHICH PRE-PREPARES FOR SHEET PROCESSING

(75) Inventors: Kiyoshi Okamoto, Ibaraki; Norifumi Miyake; Mitsushige Murata, both of Chiba, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/619,716

(22) Filed: Jul. 19, 2000

(30) Foreign Application Priority Data

Jul. 23, 1999 (JP) .......................................... 11-209157

(51) Int. Cl.[7] .............................................. G03G 15/00
(52) U.S. Cl. ........................................................ 399/82
(58) Field of Search ........................... 399/82, 407, 408, 399/410

(56) References Cited

U.S. PATENT DOCUMENTS

| | | | |
|---|---|---|---|
| 5,447,297 A | 9/1995 | Murata et al. | 270/53 |
| 5,568,247 A | 10/1996 | Murata et al. | 355/324 |
| 5,629,775 A * | 5/1997 | Platteter et al. | 358/296 |
| 5,778,300 A | 7/1998 | Murakami et al. | 399/403 |
| 5,938,186 A | 8/1999 | Sato et al. | 270/58.11 |
| 5,951,000 A | 9/1999 | Sato et al. | 270/58.11 |

FOREIGN PATENT DOCUMENTS

JP  9-160321 A  *  6/1997

* cited by examiner

Primary Examiner—Quana M. Grainger
(74) Attorney, Agent, or Firm—Fitzpatrick, Cella, Harper & Scinto

(57) ABSTRACT

Image forming apparatus connected to a sheet processing apparatus which applies sheet processing such as stapling to a sheet formed image by the image forming apparatus. The image forming apparatus includes an input terminal for inputting image forming job, an image forming unit for forming an image on a sheet in accordance with the image forming job inputted by the input terminal, a discriminator for discriminating if a first image forming job does not include sheet processing whereas a second and subsequent image forming job includes sheet processing, and a controller for instructing the sheet processing apparatus to perform a preparatory operation for he second image forming job during the first image forming job in accordance with a discrimination result, such as by moving a staple unit to designated position for the second image forming job.

79 Claims, 17 Drawing Sheets

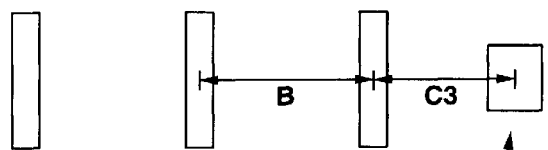
FIG.8G
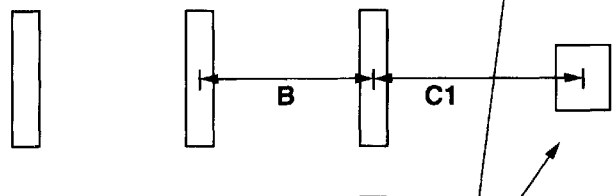
FIG.8F
FIG.8E
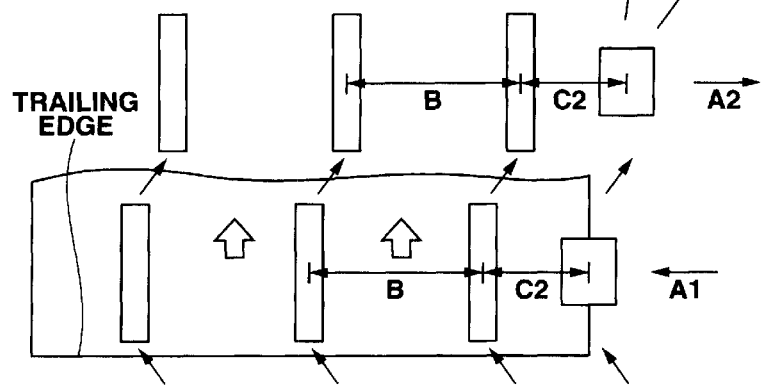
FIG.8D
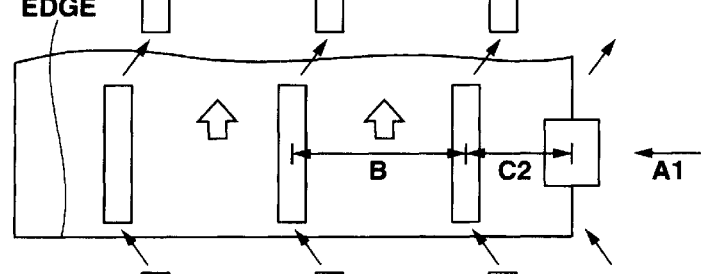
FIG.8C
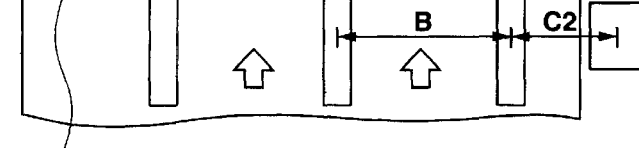
FIG.8B
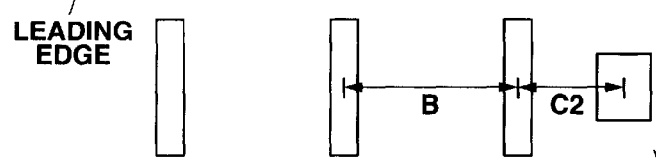
FIG.8A

IMAGE FORMING APPARATUS WHICH PRE-PREPARES FOR SHEET PROCESSING

BACKGROUND OF THE INVENTION

1. Field of the Invention

The present invention relates to control for an image forming apparatus which conducts a preparing operation for sheet processing.

2. Description of the Related Art

A conventional image forming apparatus inputs a plurality of image forming jobs and forms an image on a sheet in accordance with the image forming jobs sequentially. The conventional image forming apparatus has sheet processing functions such as sheet stapling, sheet punching, and sheet folding. These functions need preparing operations before each image forming job being processed. In the preparing operation, the image forming apparatus moves a movable unit, which is a part of a sheet processing unit, to a position according to a sheet size and a user designation. The conventional image forming apparatus conducts a first image forming job and then begins a second job, which follows the first image forming job, after the first image forming job is finished. A preparing operation of a processing unit for the second image forming job commences when the first image forming job is finished, even though the processing unit is not used in the first image forming job at all. In a case where there are many image forming jobs, a time loss caused by the preparing operation is an obstacle to an improvement of a productivity of the image forming apparatus. This will be explained with reference to FIGS. 18A and 18B.

FIGS. 18A and 18B show job schedules of a conventional image forming apparatus in a case where two image forming jobs are processed sequentially by the image forming apparatus. JOB_A and JOB_B are image forming jobs to be processed sequentially. JOB_A is processed first and JOB_B is processed second. As shown in FIG. 18A, JOB_A is processed first, and then a preparing operation for JOB_B is done after JOB_A. JOB_B is started after the preparing operation. As shown in FIG. 18B, in a case where JOB_B interrupts JOB_A, JOB_A is interrupted, and then a preparing operation for JOB_B is done. JOB_B is processed after the preparing operation. Then, JOB_A is re-started after JOB_B is finished.

As described above, when JOB_B is processed, a time for conducting a preparing operation is needed in addition to a time for processing an image forming job and prevents improvement of a productivity of the image forming apparatus.

SUMMARY OF THE INVENTION

An object of the present invention is to provide image forming apparatus which a productivity thereof is improved.

In order to achieve the above object, the present invention provides an image forming apparatus comprising an input terminal for inputting image forming jobs including a first image forming job and a second image forming job subsequent to the first, an image forming unit for forming an image on a sheet in accordance with an image forming job inputted by said input terminal, a sheet processor for applying a sheet processing to a sheet in accordance with an image forming job inputted by said input terminal, a discriminator for discriminating if the first image forming job does not include sheet processing by said sheet processor and if the second image forming job includes the sheet processing, and a controller for instructing said sheet processor to conduct a preparing operation for the sheet processing of the second image forming job during the first image forming job in accordance with a discrimination results by said discriminator.

Specifically, in the image forming apparatus, said sheet processor includes a stapler for stapling a sheet, and the preparing operation includes moving said stapler to a position according to a user designation.

Also, in the image forming apparatus, said sheet processor includes a stapler for stapling a sheet, and the preparing operation includes moving said stapler to a position according to a way of stapling.

Also, in the image forming apparatus, said sheet processor includes a stapler for stapling a sheet, and the preparing operation includes moving said stapler to a position according to a sheet size.

Also, in the image forming apparatus, said sheet processor includes a puncher for punching a sheet, and said puncher includes a sensor for detecting a side edge of the sheet, and the preparing operation includes moving said sensor to a position according to a sheet width, and said discriminator discriminates if said a sheet width of the second image forming job is equal to or larger than a sheet width of the first image forming job.

Also, in the image forming apparatus, said sheet processor includes a feeder for an insert sheet, and the preparing operation includes feeding an insert sheet to a predetermined position.

Also, in the image forming apparatus, said sheet processor includes a booklet maker for making a booklet, and said booklet maker includes a stopper for stopping a sheet in order to bind sheets and fold sheets, and the preparing operation includes moving said stopper to a position according to a sheet size.

Also, in the image forming apparatus, said sheet processor includes a booklet maker for making a booklet, and said booklet maker includes an aligner for aligning sheets, and the preparing operation includes moving said aligner to a position according to a sheet size.

Also, in the image forming apparatus, said sheet processor includes a sheet folder for folding a sheet, and said sheet folder includes a stopper for stopping a sheet in order to fold the sheet, and the preparing operation includes moving said stopper to a position according to a sheet size.

In another aspect of the invention, the present invention provides an image forming apparatus connectable to a sheet processing apparatus which applies sheet processing to a sheet, said image forming apparatus comprising an input terminal for inputting image forming jobs including a first image forming job and a second image forming job subsequent to the first, an image forming unit for forming an image on a sheet in accordance with an image forming job inputted by said input terminal, a discriminator for discriminating if the first image forming job does not include the sheet processing and if the second image forming job includes the sheet processing, and a controller for instructing said sheet processing apparatus to conduct a preparing operation for the sheet processing of the second image forming job during the first image forming job in accordance with a discrimination results by said discriminator.

In another aspect of the invention, the present invention provides a method for controlling an image forming apparatus connected to a sheet processing apparatus which applies one or more sheet processing to a sheet having an image formed by said image forming apparatus, said method comprising inputting a first image forming job, inputting a second image forming job, conducting the first image forming job, discriminating if the first image forming job does not include sheet processing and second image forming job includes sheet processing, instructing said sheet processing apparatus to conduct a preparing operation for the sheet processing of the second image forming job during said conducting step of the first image forming job in accordance with the discrimination, and conducting the second image forming job.

In another aspect of the invention, the present invention provides a recording medium, which includes code for process steps that can be read by a controller of an image forming apparatus connected to a sheet processing apparatus which applies one or more sheet processing to a sheet having an image formed by said image forming apparatus, said code comprising code for inputting a first image forming job, code for inputting a second image forming job, code for conducting the first image forming job, code for discriminating if the first image forming job does not include sheet processing and second image forming job includes sheet processing, code for instructing said sheet processing apparatus to conduct a preparing operation for the sheet processing of the second image forming job during said conducting step of the first image forming job in accordance with the discrimination, and code for conducting the second image forming job.

In another aspect of the invention, the present invention provides a computer program, which includes code for process steps that can be conducted by a controller of an image forming apparatus connected to a sheet processing apparatus which applies one or more sheet processing to a sheet having an image formed by said image forming apparatus, said code comprising code for inputting a first image forming job, code for inputting a second image forming job, code for conducting the first image forming job, code for discriminating if the first image forming job does not include sheet processing and second image forming job includes sheet processing, code for instructing said sheet processing apparatus to conduct a preparing operation for the sheet processing of the second image forming job during said conducting step of the first image forming job in accordance with the discrimination, and code for conducting the second image forming job.

Other objects and features of the invention will be apparent from the following description and the drawings.

BRIEF DESCRIPTION OF THE DRAWINGS

FIGS. 8A through 8G show movement of the rollers and the sensor.

DESCRIPTION OF THE PREFERRED EMBODIMENTS

Figure 1:
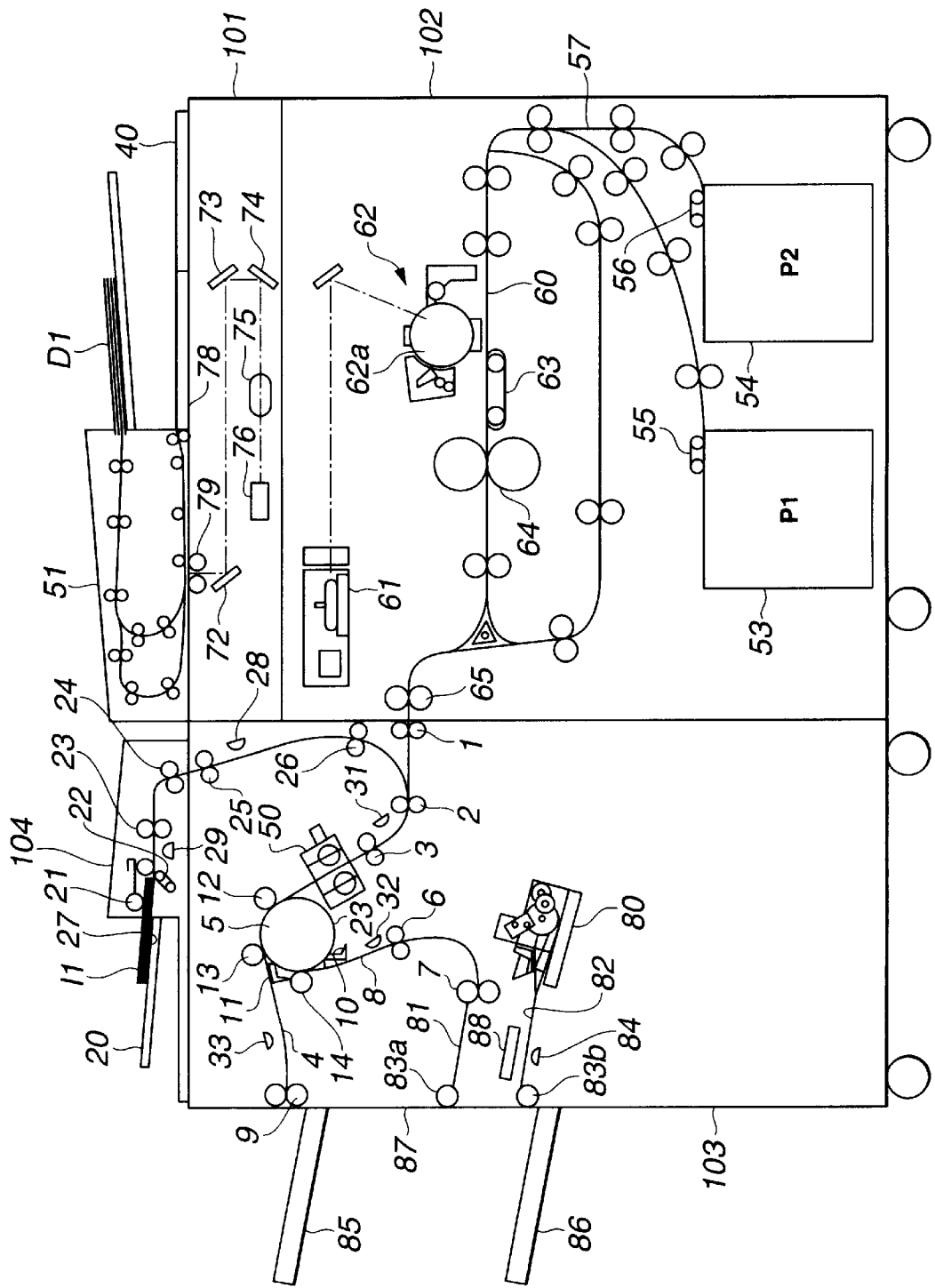
FIG. 1 shows an image forming system which includes an image forming apparatus and a sheet processing apparatus.

FIG. 1 shows an image forming system which comprises document reading apparatus 101, image forming apparatus 102 and sheet processing apparatus 103.

Document reading apparatus 101 includes document feeder 51. Document feeder 51 feeds an original document D1 onto a reading position of document glass 78 and transports the document to a discharging position 40. Document reading apparatus 101 includes lump 79, mirrors 72, 73 and 74 and lens 75. Lamp 79 exposes document D1 fed onto the reading position of document reading apparatus 101. Mirrors 72, 73 and 74 lead light reflected from document D1 to lens 75. Lens 75 focuses the reflected lights onto CCD line sensor (CCD) 76. CCD 76 converts the focused image into an electrical signal. The electrical signal is converted into a digital signal by an A/D converter (not shown). The digital signal is outputted to laser scanner 61 which is described later.

Image forming apparatus 102 has sheet cassettes 53 and 54 which hold sheets P1 and P2 respectively. The size of sheets P1 and P2 are different. Sheets P1 and P2 are fed by pick-up belts 55 and 56 respectively. The sheet is transported to sheet path 60 via sheet path 57. Image forming apparatus 102 has laser scanner 61. Laser scanner 61 emits a laser beam toward photosensitive drum 62a of image forming unit 62 in accordance with the digital signal converted from CCD 76 to form an electrostatic latent image on photosensitive drum 62a. Image forming unit 62 develops the electrostatic latent image by toner to visualize the electrostatic latent image and transfers the toner image onto a sheet transported to sheet path 60.

The sheet having the toner image is transported to fixing roller 64 by transporting belt 63. Fixing roller 64 fixes the toner image on the sheet by heat and pressure. Roller 65 transports the sheet to sheet processing apparatus 103. Image forming unit 62 may be an ink jet printer which forms an image on a sheet by an ink jet process.

Operation panel 40 is provided on the top of document reading apparatus 101 for setting modes and for showing the modes of image forming apparatus 102 and sheet processing apparatus 103. Operation panel 40 has a display, a touch panel, a keypad, a stop key, a reset key and a start key. The display displays settings such as image forming modes and a number of image formation set by the touch panel and the keypad. The touch panel is provided on the display and enables a user to set various settings easily. The keypad is provided for setting a number of image formation. The stop key is provided for interrupting the image formation of image forming apparatus 102. The start key is provided for starting the image formation of image forming apparatus 102.

Operation panel 40 and document reading apparatus 101 function as an input terminal for inputting an image forming job. The input terminal is not limited to be an operation panel and a document reading apparatus. An input terminal can be a printer board which receives an image forming job from a computer and is connected to image forming apparatus 102. An input terminal can be a network board which receives image forming jobs from a plurality of computers through a network. An input terminal can be a facsimile board which receives an image forming job from a facsimile machine and is connected to image forming apparatus 102. Other equivalent forms of an input terminal are possible.

Sheet processing apparatus 103 has sheet feeder 104 which feeds insert sheet I1. Insert sheet I1 fed by sheet feeder 104 is transported to either stack tray 85 or stack tray 86 without going through image forming apparatus 102. Insert sheet I1 can be a color blank sheet or a sheet formed image by another image forming apparatus such as a color printer. Since sheet feeder 104 can feed insert sheet I1 between timings that image forming apparatus 102 discharges sheets to sheet processing apparatus 103, sheet feeder 104 is called an inserter.

Insert sheet I1 set on tray 20 is fed by rollers 21 and 22. Roller 21 rotates a feeding direction to feed insert sheet I1. Roller 22 rotates an opposite direction to the feeding direction to separate the rest of sheets from insert sheet I1. Sheet feeder 104 feeds the top insert sheet I1 on tray 20. Sensor 29 detects if rollers 21 and 22 feeds insert sheet I1. Insert sheet I1 is transported by roller 23, 24, 25 and 26. Sensor 27 is provided on tray 20 for detecting if there is insert sheet I1 on tray 20.

Sheet P1, P2 or I1 is transported by roller 2 and 3. When punching processing is designated by operation panel 40, punching unit 50 punches the sheet transported by roller 3. The sheet is looped to buffer roller 5 after the sheet is processed by punching unit 50 or after it passes punching unit 50. Rollers 12, 13 and 14 and flapper 10 and 11 are provided around buffer roller 5. Flapper 11 leads the sheet to either non-sort path 4 or sort path 8 by switching the position of flapper 11. Flapper 10 leads the sheet to either buffer path 23 or sort path 8 by switching the position of flapper 10. Buffer path 23 stores the sheet temporarily. Sensor 32 is provided on sort path 8 for detecting sheet P1, P2 or I1.

Sensor 33 is provided on non-sort path 4 for detecting sheet P1, P2 or I1. Sheet P1, P2 or I1 transported to non-sort path 4 is discharged to stack tray 85 by discharge roller 9.

The sheet led to sort path 8 is transported to processing unit 84 by roller 6. Processing unit 84 has processing tray 82 which stacks sheets temporarily. The sheets on processing tray 82 are aligned by aligning plate 88 and stapled by staple unit 80 if designated by operation panel 40. Staple unit 80 is movable in a sheet width direction which is perpendicular to a sheet transportation direction. Stapling position can be selected from among several positions such as corner stapling and 2-position stapling by operation panel 40. Staple unit 80 is moved in accordance with the designation of operation panel 40 and a sheet width. The bundle of sheets on processing tray 82 is discharged to stack tray 86 by roller 83*a* and 83*b*. Roller 83*a* touches the bundle of sheets on processing tray 82 and discharges the bundle of sheets when stay 81 swings down.

Stack tray 85 and stack tray 86 incline toward housing 87 of sheet processing apparatus 103. The sheet discharged onto stack tray 85 or stack tray 86 slides toward housing 87 and hits housing 87. Thereby, the sheets are aligned on stack tray 85 and stack tray 86.

Figure 2:
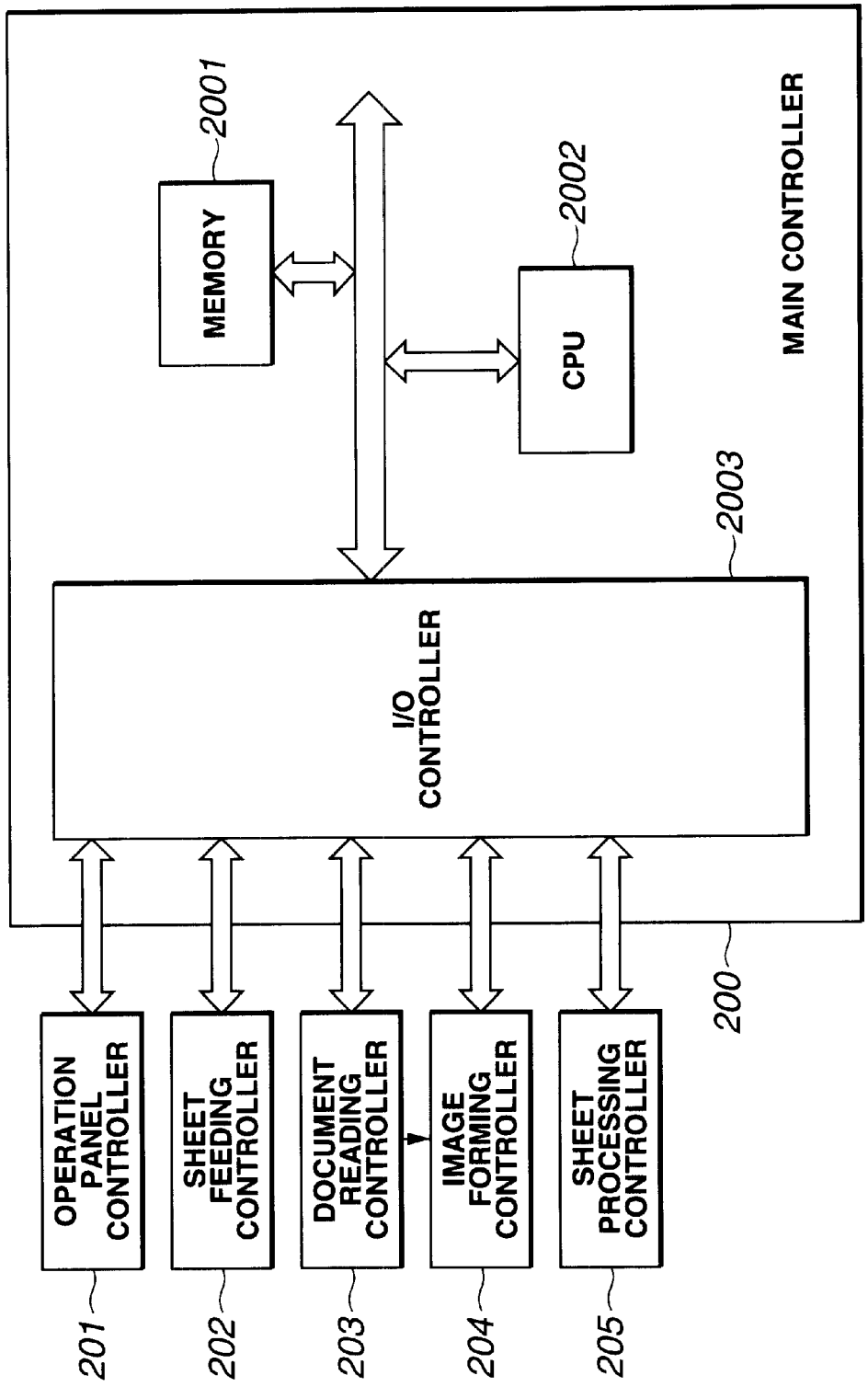
FIG. 2 is a block diagram for explaining control over the image forming system.

FIG. 2 shows block diagram for controlling the image forming system shown in FIG. 1. Main controller 200 has CPU 2002, memory 2001 and I/O controller 2003. CPU 2002 controls and administrates the whole of the image forming system in accordance with a program code which is stored in memory 2001. Memory 2001 includes ROM, RAM, IC card, hard disk and floppy disk. Although a program code described hereinafter is stored in ROM of memory 2001, the program code can be stored in CD-ROM, floppy disk or Internet server and can be installed into RAM or hard disk of memory 2001. I/O controller 2003 controls inputting and outputting of signals. I/O controller 2003 and memory 2001 are controlled by CPU 2002.

I/O controller 2003 is connected to operation panel controller 201, sheet feeding controller 202, document reading controller 203, image forming controller 204 and sheet processing controller 205. Main controller 200 controls operation panel controller 201, sheet feeding controller 202, document reading controller 203, image forming controller 204 and sheet processing controller 205 via I/O controller 2003.

When a user makes copy by using this image forming system, the user sets documents on document feeder 51 and designates settings and number of copies by operation panel 40. In response to the start key of operation panel 40 being pushed, document feeder 51 feeds documents to document glass 78 one by one and document reading apparatus 101 reads the documents. CCD 76 converts the document image to electric signal and outputs the electric signal as image signal. Image processing, which is designated by the user through operation panel 40, is applied to the image signal outputted from CCD 76. Then, the image signal is converted into laser signal for exposing photosensitive drum 62*a*. The image according to the image signal is formed on a sheet through an electrophotography process. The sheet on which the image is formed is transported into sheet processing apparatus 103 via roller 65 and 1. Sheet processing apparatus 103 is controlled by main controller 200 in accordance with a designation from operation panel 40.

When a feed of insert sheet I1 by sheet feeder 104 is designated by the user through operation panel 40, main controller 200 instructs sheet processing controller 205 to move roller 21 down until roller 21 touches the top of sheets I1. Then, main controller 200 instructs processing controller 205 to drive motors for roller 21, 22, 23 and 24 at the timing designated by the user through operation panel 40.

When sheet punching is designated by the user through operation panel 40, main controller 200 instructs sheet processing controller 205 to drive a motor for punching unit 50 in order to punch a sheet.

Main controller 200 instructs sheet processing controller 205 to drive flapper 11 in order to switch paths. When a sheet is transported to stack tray 85, the sheet is discharged by discharge roller 9. When a sheet is transported to stack tray 86, the sheet is discharged onto processing tray 82 by discharge roller 7 via roller 6.

When sheet stapling is designated by the user through operation panel 40, main controller 200 instructs sheet processing controller 205 to move staple unit 80 to a position designated by operation panel 40 and to staple sheets on processing tray 82. Main controller 200 also instructs sheet processing controller 205 to drive aligning plate 88 in order to align a sheet and to control a stacking position of a sheet on stack tray 86. Main controller 200 instructs sheet processing controller 205 to drive discharge roller 83a and 83b in order to discharge a bundle of sheets on processing tray 82 to stack tray 86 after instructing sheet processing controller 205 to move stay 81 down.

When a reading operation for first set of documents, which is set on document feeder 51, is done, main controller 200 permits a reading operation for second set of documents even if an image forming operation for the first set of documents is not done. That is, a mode setting operation and a reading operation for second image forming job or succeeding image forming job is available during a first image forming job. An user can make a reservation for the second or succeeding image forming job during the first image forming job.

When the second image forming job includes a stapling operation which is not designated by the first image forming job, main controller 200 instructs sheet processing controller 205 to move staple unit 80 to a position designated for the second image forming job during the first image forming job. After the first image forming job is finished, main controller 200 instructs image forming controller 204 to conduct the second image forming job.

Figure 5A:
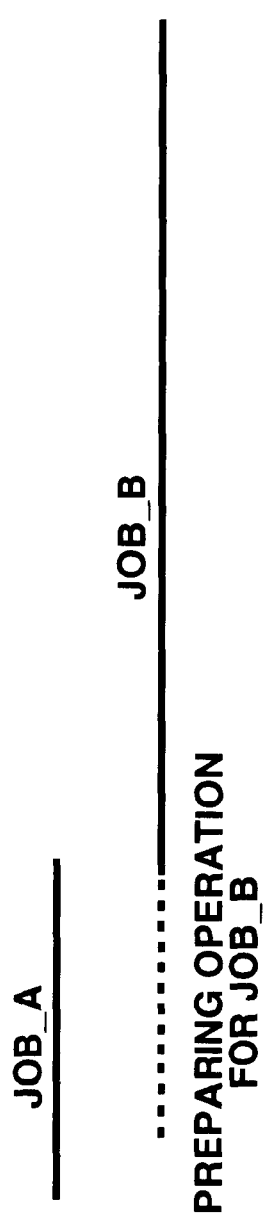
FIGS. 5A and 5B are timing diagrams showing timing to conduct the preparing operation.
Figure 5B:
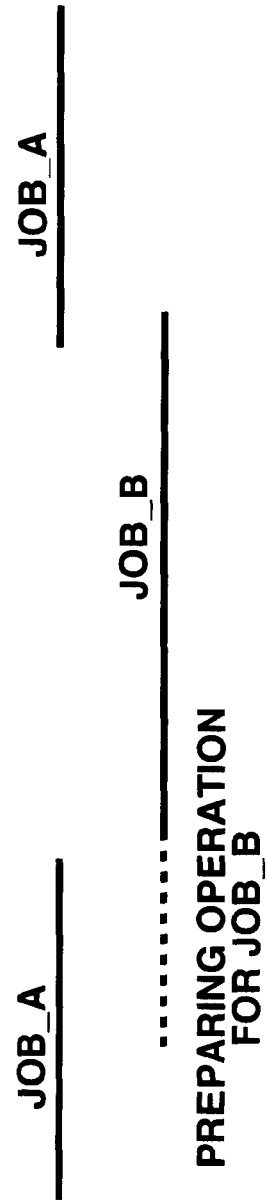

When main controller 200 is informed that JOB_B including a stapling operation follows JOB_A not including the stapling operation, main controller 200 instructs sheet processing controller 205 to conduct a preparing operation for the stapling operation of JOB_B during JOB_A as shown in FIG. 5A. Therefore, JOB_B can be started right after JOB_A is finished. When main controller 200 is informed that JOB_B including a stapling operation which interrupts JOB_A not including the stapling operation, main controller 200 instructs sheet processing controller 205 to conduct the preparing operation for the stapling operation of JOB_B as shown in FIG. 5B. After the preparing operation is finished, main controller 200 instructs image forming controller 204 to interrupt JOB_A and to conduct JOB_B. Then, after JOB_B is finished, main controller 200 instructs image forming controller 204 to recover JOB_A. As mentioned above, the preparing operation for JOB_B is conducted in parallel with JOB_A. Thereby, the total job time is shortened.

Figure 3:
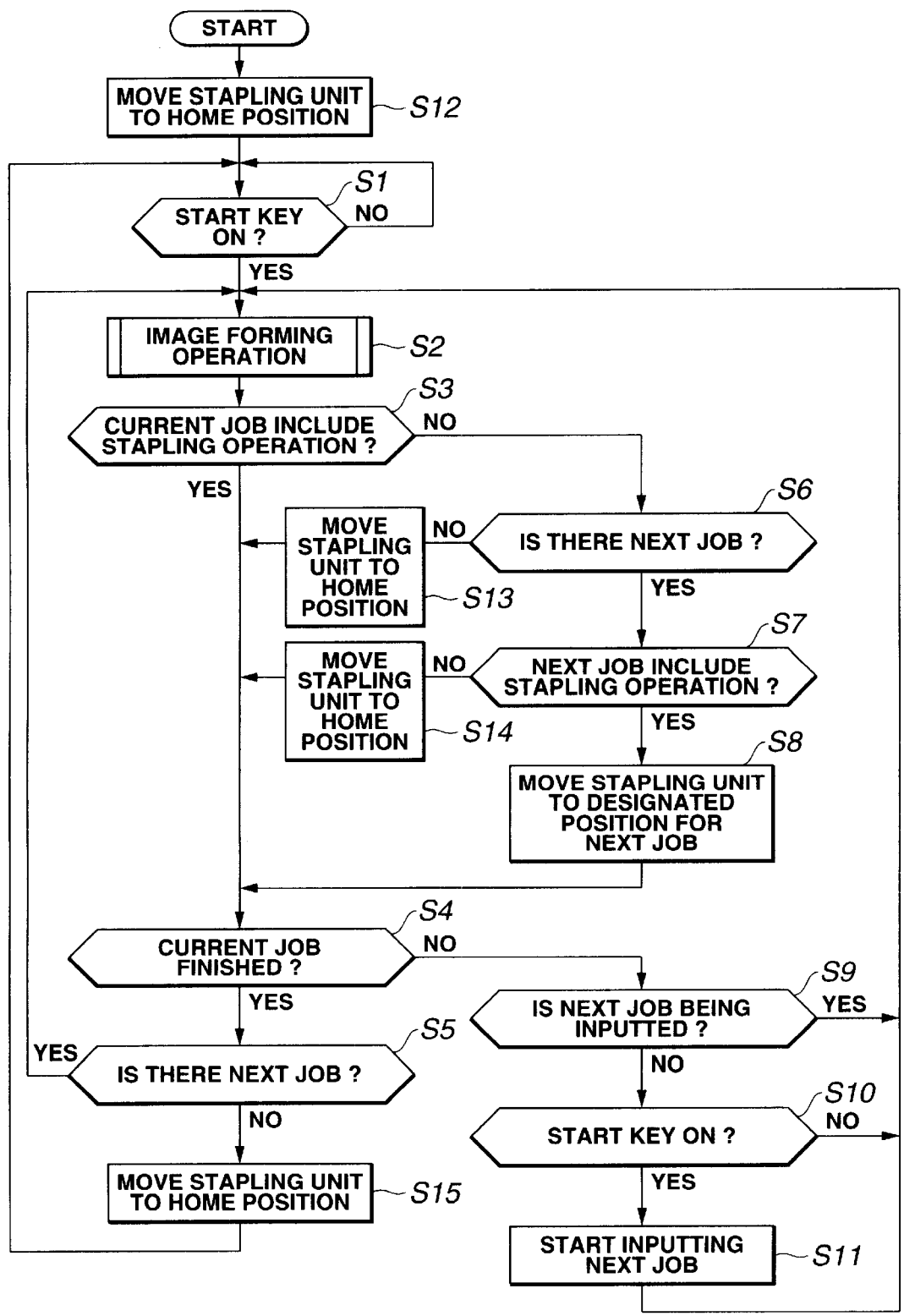
FIG. 3 is a flowchart showing a preparing operation for a stapling operation of a reserved image forming job.

FIG. 3 is a flowchart for conducting a preparing operation of a reserved image forming job such as the above second image forming job (JOB_B). A program code of the flowchart of FIG. 3, as well as all flowcharts herein, is stored in ROM of memory 2001 and is conducted by CPU 2002. CPU 2002 receives designations about sheet stacking, sheet stapling, sheet punching and sheet inserting from operation panel controller 201 which connects to operation panel 40. CPU 2002 controls sheet feeding controller 202, document reading controller 203, image forming controller 204 and sheet processing controller 205 in accordance with the designations from operation panel controller 201.

As shown in FIG. 3, CPU 2002 instructs sheet processing controller 205 to move stapling unit 80 to a home position (S12). Then, CPU 2002 checks if the start key of operation panel 40 is pressed by an user (S1). When the start key is pressed, CPU 2002 instructs the start of an image forming operation (S2). Then, CPU 2002 discriminates if a current job includes a stapling operation (S3). If the current job does not include the stapling operation, CPU 2002 discriminates if there is a next job (S6). If there is a next job, CPU 2002 discriminates if the next job includes a stapling operation (S7). If the next job includes the stapling operation, CPU 2002 instructs sheet processing controller 205 to move stapling unit 80 to a designated position for the next job during the current job (S8). The designated position is determined by a way of stapling, which is designated by the user through operation panel 40, and a sheet size. Then, CPU 2002 discriminates if the current job is finished (S4). In a case where stapling unit 80 is not in the home position before executing step S8, CPU 2002 instructs sheet processing controller 205 to move stapling unit 80 directly to a designated position from a current position without returning stapling unit 80 to the home position.

If the current job includes the stapling operation at step S3, CPU 2002 proceeds step S4. If there is no next job at step S6 or if the next job does not include the stapling operation at step S7, CPU 2002 instructs sheet processing controller 205 to move stapling unit 80 to the home position (S13, S14) and proceeds to step S4.

If the current job is finished at step S4, CPU 2002 discriminates if there is a next job (S5). If there is a next job, CPU 2002 returns to step S2. If there is no next job at step S5, CPU 2002 instructs sheet processing controller 205 to move stapling unit 80 to the home position (S15) and returns to step S1.

If the current job is not finished at step S4, CPU 2002 discriminates if a next job is being inputted, that is, documents of the next job are being read (S9). If a next job is being inputted, CPU 2002 returns to step S2. If a next job is not being inputted at step S9, CPU 2002 discriminates if the start key of operation panel 40 is pressed for inputting a next job (S10). If the start key is not pressed, CPU 2002 returns to step S2. If the start key is pressed at step S10, CPU 2002 instructs document reading controller 203 to start inputting documents of the next job (S11) and returns to step S2.

Figure 4:
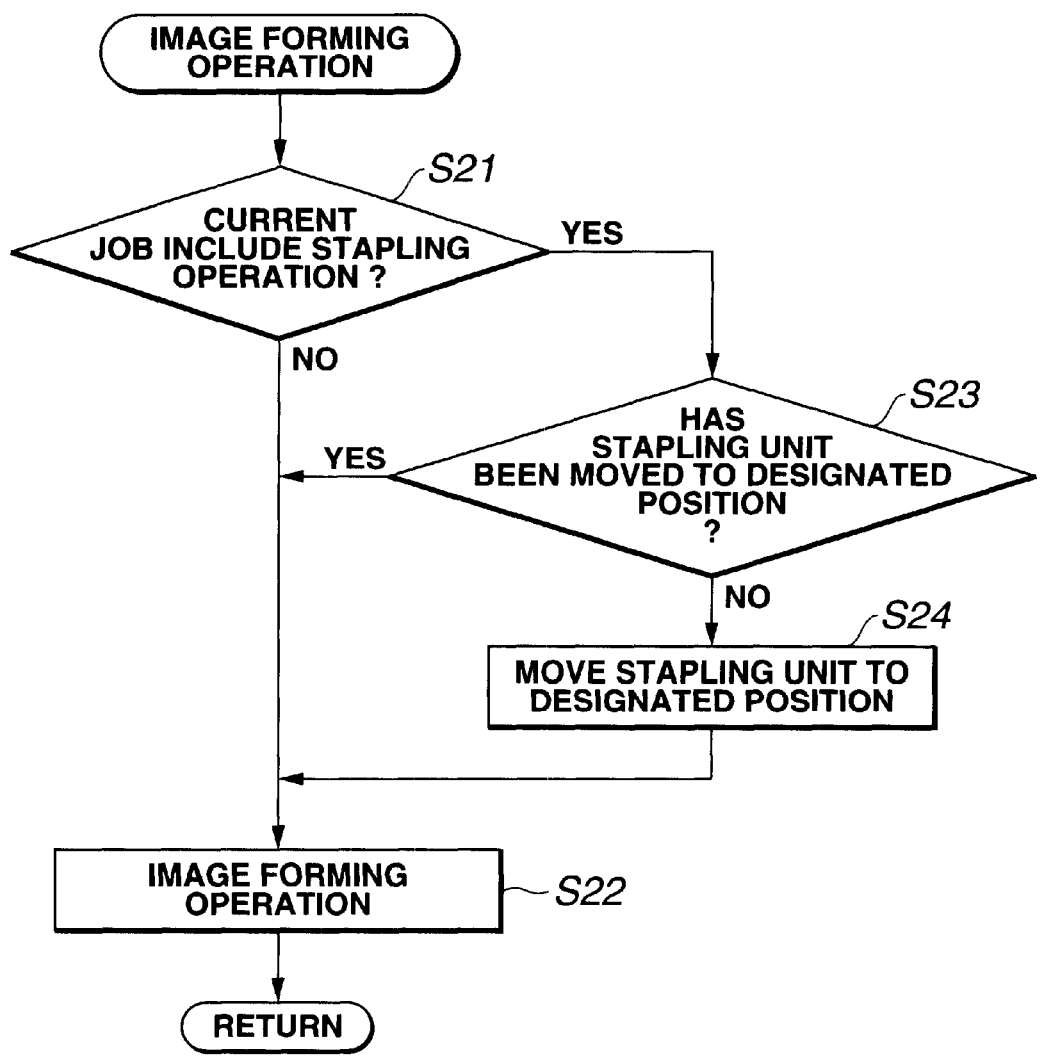
FIG. 4 is a flowchart showing a preparing operation regarding sheet stapling operation.

FIG. 4 shows a flowchart of a subroutine of the image forming operation at step S2. CPU 2002 discriminates if a current job includes a stapling operation (S21). If the current job does not include the stapling operation, CPU 2002 instructs image forming controller 204 to conduct an image forming operation (S22) and returns to the flowchart shown in FIG. 3. If the current job includes the stapling operation at step S21, CPU 2002 discriminates if stapling unit 80 has been moved to the designated position for the current job (S23). If stapling unit 80 has been moved to the designated position, CPU 2002 proceeds to step S22. If stapling unit 80 has not been moved to the designated position, CPU 2002 instructs sheet processing controller 205 to move stapling unit 80 to the designated position (S24) and proceeds to step S22. In a case where stapling unit 80 is not in the home position before executing step S24, CPU 2002 instructs sheet processing controller 205 to move stapling unit 80 directly to the designated position from a current position without returning stapling unit 80 to the home position.

Conducting the preparing operation for the next job during the current job is applicable to not only sheet stapling but also any other sheet processing, such as sheet punching, insert sheet feeding, booklet making and sheet folding.

Figure 6:
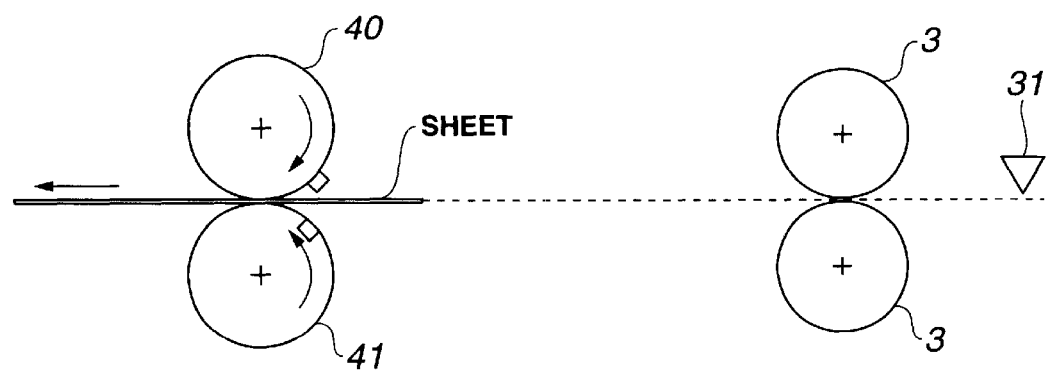
FIG. 6 shows a side view of punch unit.

FIG. 6 shows a side view of punch unit 50. Punch unit 50 has rollers 40 and 41. Rollers 40 and 41 are metal rollers and have a protrusion and a depression respectively. When a sheet is punched, rollers 40 and 41 rotate in the direction shown in FIG. 6 in sync with the transportation of the sheet. Thereby, a sheet is punched by the protrusion of roller 40 and the depression of roller 41 while the sheet is being transported. Rollers 40 and 41 start rotating at a predetermined timing that the trailing side of the sheet is punched.

There is a gap between roller 40 and roller 41 so that a sheet can be transported without rotating rollers 40 and 41 when the sheet is not punched.

Figure 7:
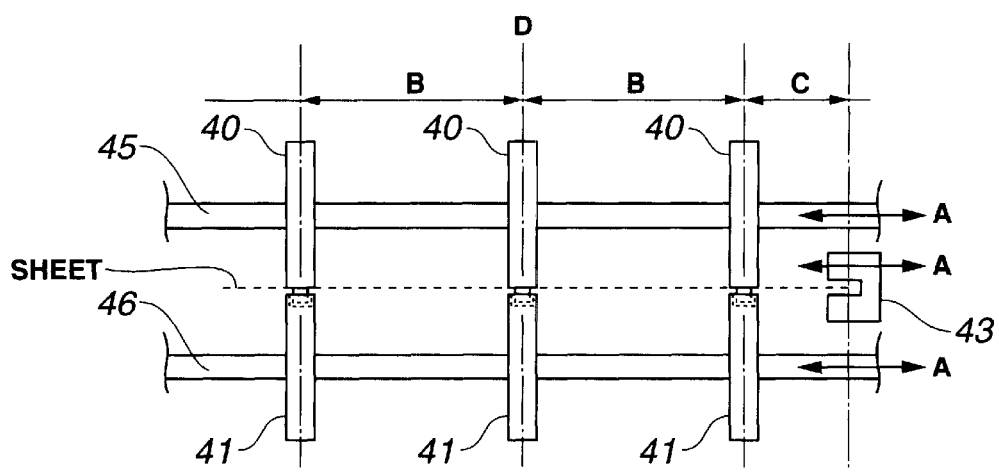
FIG. 7 shows a front view of punch unit.

FIG. 7 shows a front view of punch unit 50. Punch unit 50 has three rollers 40 and 41 in order to punch 3-holes to a sheet. Rollers 40 and rollers 41 are fixed to shafts 45 and 46 respectively. The distance B between rollers 40 and the distance B between rollers 41 are constant. Although a sheet is basically transported with reference to a center D whenever a sheet in any size is transported, sometimes the center of the sheet is shifted from the center D in direction A by the time the sheet reaches to punch unit 50. Shafts 45 and 46 are movable in direction A in order to adjust rollers 40 and 41 to a sheet. Sensor 43 detects a side edge of a sheet and is movable with shafts 45 and 46 dependently in direction A to adjust rollers 40 and 41 to a position of a sheet. Sensor 43 is also movable independently to adapt to a width of a sheet in a preparing operation.

FIGS. 8A through 8G show movements of rollers 40 and sensor 43. First, rollers 40 and sensor 43 are in a home position as shown in FIG. 8A. At this time, the distance between right most roller 40 and sensor 43 is C1. In a preparing operation, sensor 43 is moved to a position according to a sheet width as shown in FIG. 8B. At this time, the distance between right most roller 40 and sensor 43 is C2 which is less than C1. The distance B+C2 is equal to a half width of a sheet. When a leading edge of a sheet reaches to punch unit 50 as shown in FIG. 8C, rollers 40 and sensor 43 are started moving in direction A1. When sensor 43 detects the side edge of the sheet, rollers 40 and sensor 43 are stopped as shown in FIG. 8D. Then, the trailing side of the sheet is punched by rotating rollers 40 and 41. After a sheet punching operation, rollers 40 and sensor 43 are returned as shown in FIG. 8E for a next sheet. When a job finished, sensor 43 is moved to either the home position as shown in FIG. 8F or another position according to a sheet width for another job as shown in FIG. 8G.

Figure 9:
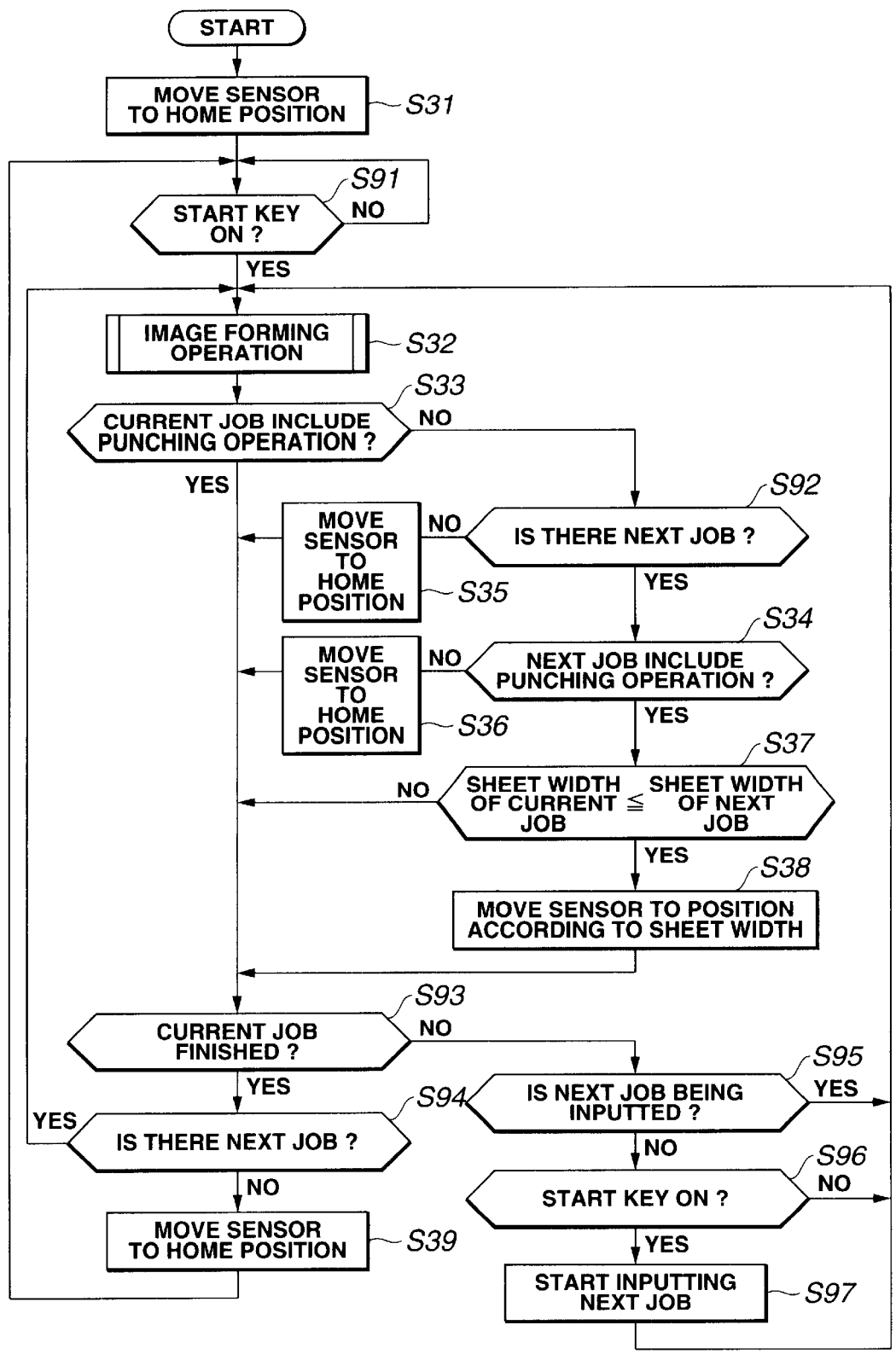
FIG. 9 is a flowchart showing a preparing operation regarding sheet punching operation.

FIG. 9 shows a flowchart for conducting a preparing operation regarding a sheet punching operation. A program code of the flowchart is stored in ROM of memory 2001 and is conducted by CPU 2002.

As shown in FIG. 9, CPU 2002 instructs sheet processing controller 205 to move sensor 43 to a home position (S31). Then, CPU 2002 checks if the start key of operation panel 40 is pressed by an user (S91). When the start key is pressed, CPU 2002 instructs the start of an image forming operation (S32). Then, CPU 2002 discriminates if a current job includes a punching operation (S33). If the current job does not include the punching operation, CPU 2002 discriminates if there is a next job (S92). If there is a next job, CPU 2002 discriminates if the next job includes a punching operation (S34). If the next job includes a punching operation, CPU 2002 compares a sheet width of the next job and a sheet width of the current job (S37). If the sheet width of the next job is larger than the sheet width of the current job or is equal to the sheet width of the current job, CPU 2002 instructs sheet processing controller 205 to move sensor 43 to a position according to the sheet width of the next job (S38). Then, CPU 2002 discriminates if the current job is finished (S93). In a case where sensor 43 is not in the home position before executing step S38, CPU 2002 instructs sheet processing controller 205 to move sensor 43 directly to a position according to the sheet width of the next job from a current position without returning sensor 43 to the home position.

If the current job includes a punching operation at step S33, CPU 2002 proceeds to step S93. If there is no next job at step S92 or if the next job does not include the punching operation at step S34, CPU 2002 instructs sheet processing controller 205 to move sensor 43 to the home position (S35, S36) and proceeds to step S93. If the sheet width of the next job is smaller than the sheet width of the current job at step S37, CPU 2002 proceeds to step S93.

If the current job is finished at step S93, CPU 2002 discriminates if there is a next job (S94). If there is a next job, CPU 2002 returns to step S32. If there is no next job at step S94, CPU 2002 instructs processing controller 205 to move sensor 43 to the home position (S39) and returns to step S91.

If the current job is not finished at step S93, CPU 2002 discriminates if a next job is being inputted, that is, documents of the next job are being read (S95). If a next job is being inputted, CPU 2002 returns to step S32. If a next job is not being inputted at step S95, CPU 2002 discriminates if the start key of operation panel 40 is pressed for inputting a next job (S96). If the start key is not pressed, CPU 2002 returns to step S32. If the start key is pressed at step S96, CPU 2002 instructs document reading controller 203 to start inputting documents of the next job (S97) and returns to step S32.

Figure 10:
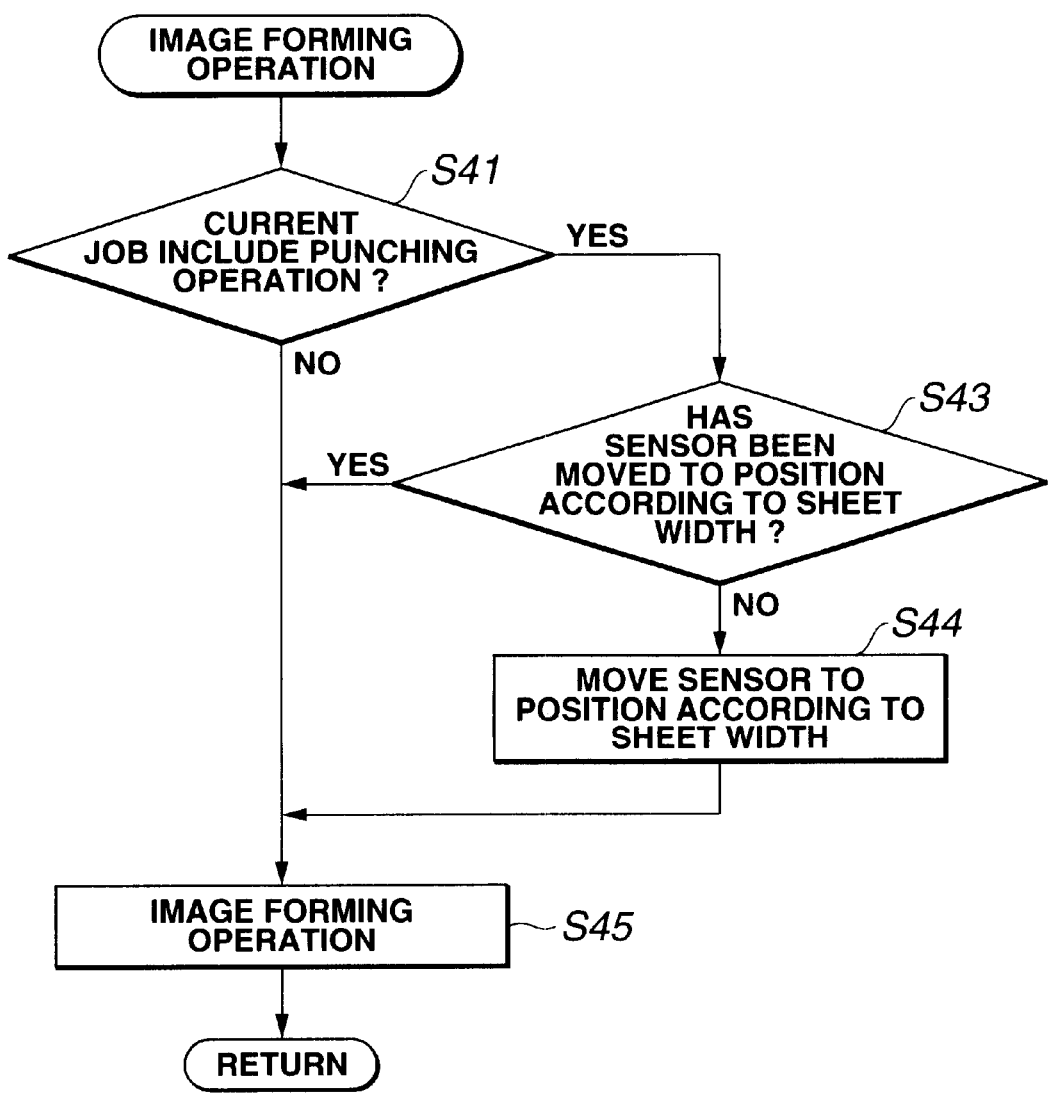
FIG. 10 is a flowchart showing the image forming operation shown in FIG. 9.

FIG. 10 shows a flowchart of a subroutine of the image forming operation at step S32. CPU 2002 discriminates if a current job includes a punching operation (S41). If the current job does not include the punching operation, CPU 2002 instructs image forming controller 204 to conduct an image forming operation (S45) and returns to the flowchart shown in FIG. 9. If the current job includes the punching operation at step S41, CPU 2002 discriminates if sensor 43 has been moved to the position according to the sheet width of the current job (S43). If sensor 43 has been moved to the position, CPU 2002 proceeds to step S45. If sensor 43 has not been moved to the position, CPU 2002 instructs sheet processing controller 205 to move sensor 43 to the position (S44) and proceeds to step S45. In a case where sensor 43 is not in the home position before executing step S44, CPU 2002 instructs sheet processing controller 205 to move sensor 43 directly to a position according to the sheet width of the current job from a current position without returning sensor 43 to the home position.

Figure 11:
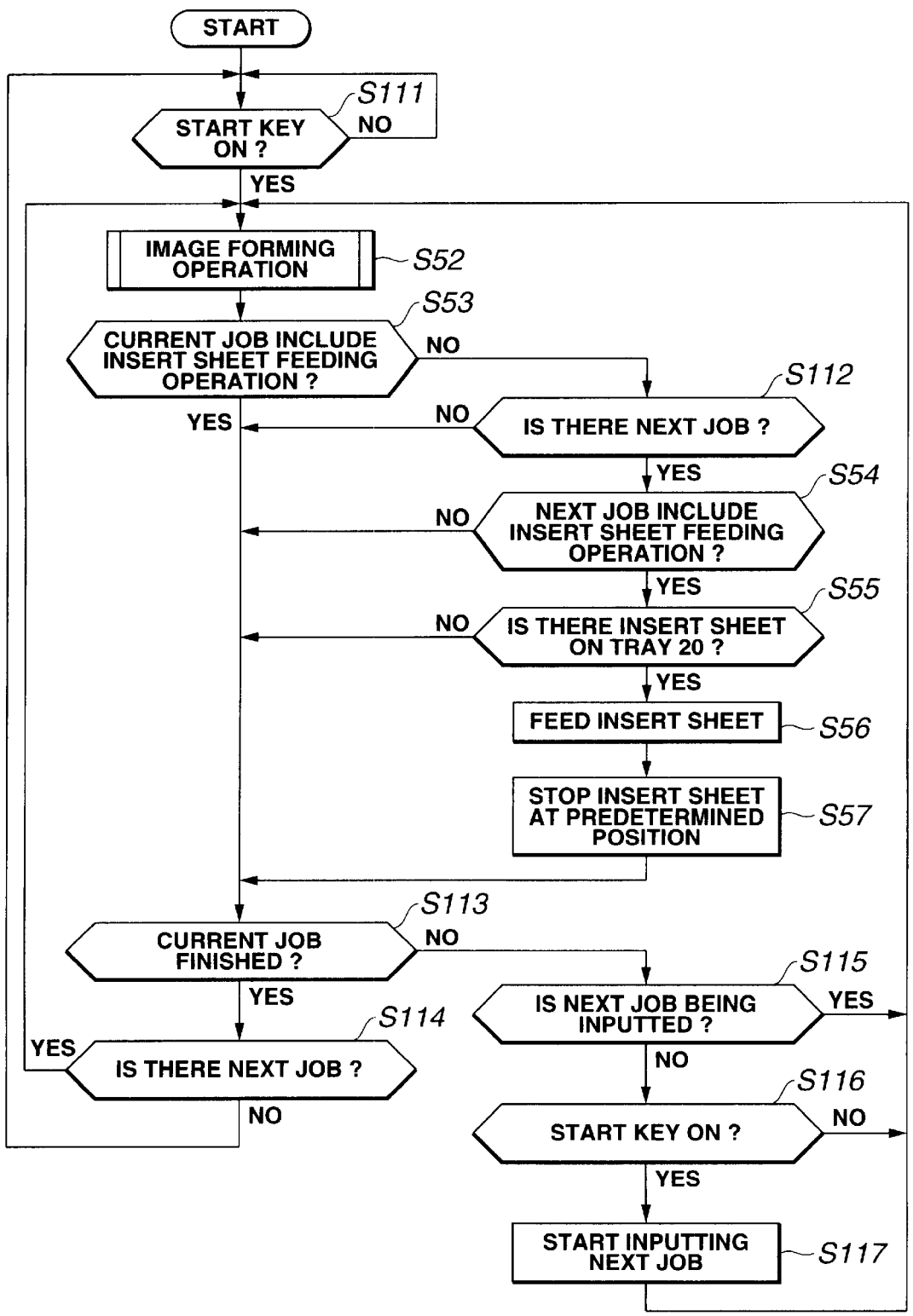
FIG. 11 is a flowchart showing a preparing operation regarding insert feeding operation.

FIG. 11 shows a flowchart for conducting a preparing operation regarding a feed operation for an insert sheet. A program code of the flowchart is stored in ROM of memory 2001 and is conducted by CPU 2002.

As shown in FIG. 11, CPU 2002 checks if the start key of operation panel 40 is pressed by an user (S111). When the start key is pressed, CPU 2002 instructs the start of an image forming operation (S52). Then, CPU 2002 discriminates if a current job includes an insert sheet feeding operation (S53). If the current job does not include an insert sheet feeding operation, CPU 2002 discriminates if there is a next job (S112). If there is a next job, CPU 2002 discriminates if the next job includes an insert sheet feeding operation (S54). If the next job includes an insert sheet feeding operation, CPU 2002 discriminates if insert sheet I1 is set on tray 20 based on a detection result of sensor 27 (S55). If insert sheet I1 is set on tray 20, CPU 2002 instructs sheet processing controller 205 to feed insert sheet I1 (S56) and to stop insert sheet I1 at a predetermined position which is right before roller 2 (S57). CPU 2002 monitors a position of a transported insert sheet I1 by sensor 28 and controls the stopping position of the insert sheet I1. After stopping insert sheet I1, CPU 2002 discriminates if the current job is finished (S113).

If the current job includes the insert sheet feeding operation at step S53, CPU 2002 proceeds to step S113. If there is no next job at step S112 or if the next job does not include an insert sheet feeding operation at step S54, CPU 2002 proceeds to step S113. If insert sheet I1 is not set on tray 20 at step S55, CPU 2002 proceeds to step S113.

If the current job is finished at step S113, CPU 2002 discriminates if there is a next job (S114). If there is a next job, CPU 2002 returns to step S52. If there is no next job at step S114, CPU 2002 returns to step S111.

If the current job is not finished at step S113, CPU 2002 discriminates if a next job is being inputted, that is, documents of the next job are being read (S115). If a next job is being inputted, CPU 2002 returns to step S52. If a next job is not being inputted at step S115, CPU 2002 discriminates if the start key of operation panel 40 is pressed for inputting a next job (S116). If the start key is not pressed, CPU 2002 returns to step S52. If the start key is pressed at step S116, CPU 2002 instructs document reading controller 203 to start inputting documents of the next job (S117) and returns to step S52.

Figure 12:
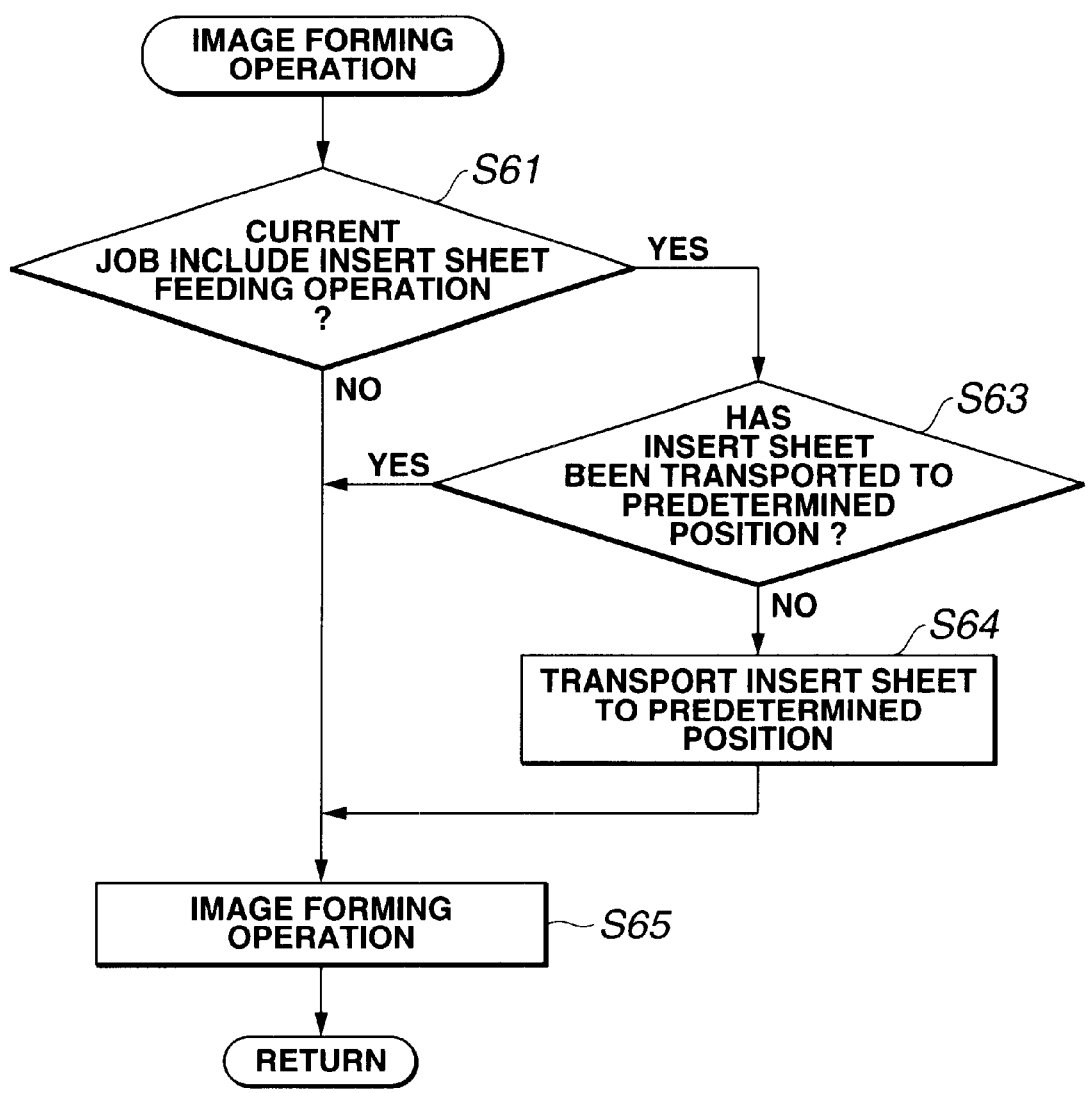
FIG. 12 is a flowchart showing the image forming operation shown in FIG. 11.

FIG. 12 shows a flowchart of a subroutine of the image forming operation at step S52. CPU 2002 discriminates if a current job includes an insert sheet feeding operation (S61). If the current job does not include an insert sheet feeding operation, CPU 2002 instructs image forming controller 204 to conduct an image forming operation (S65) and returns to the flowchart shown in FIG. 11. If the current job includes an insert sheet feeding operation at step S61, CPU 2002 discriminates if insert sheet I1 has been transported to the predetermined position (S63). If insert sheet I1 has been transported to the predetermined position, CPU 2002 proceeds to step S65. If insert sheet I1 has not been transported to the predetermined position (S63), CPU 2002 instructs sheet processing controller 205 to feed insert sheet I1 to the predetermined position (S64) and proceeds to step S65.

Figure 13:
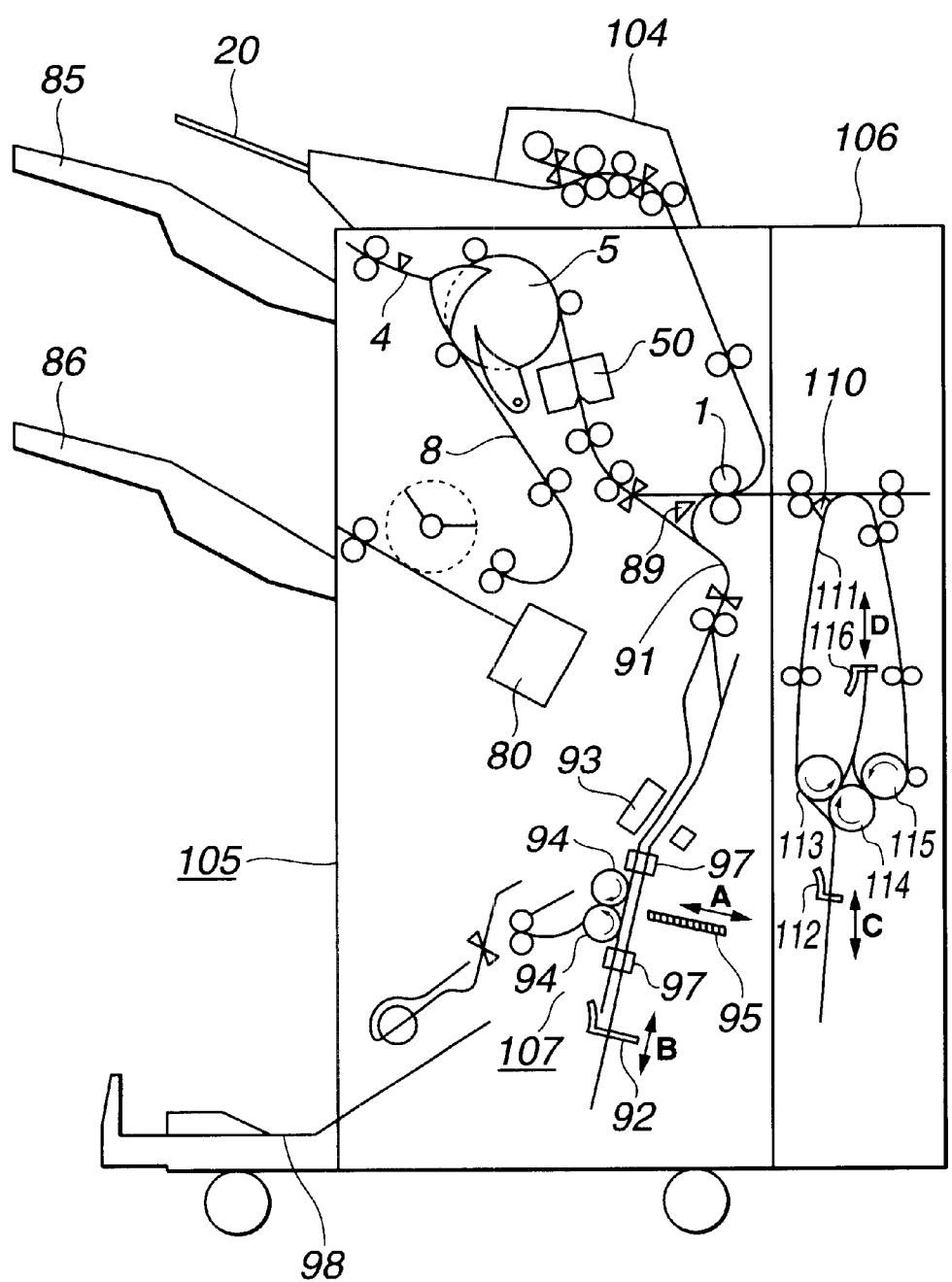
FIG. 13 shows a sheet processing apparatus.

FIG. 13 shows sheet processing apparatus 105 which conducts booklet making and sheet folding in addition to sheet stapling, sheet punching and insert sheet feeding which are conducted by sheet processing apparatus 103. Sheet processing apparatus 105 is controlled by CPU 2002 through sheet processing controller 205. Sheet processing apparatus 105 includes sheet folding apparatus 106 and booklet making unit 107.

When booklet making is selected, a sheet is led to path 91 by flapper 89. The sheet is stopped by stopper 92 in order to staple at the center of the sheet by staple unit 93. Sheets at staple unit 93 are aligned by aligning plate 97. Stopper 92 is movable in a direction shown by arrow A. Aligning plate 97 is movable in a sheet width direction in accordance with a sheet width. At the time of stapling by staple unit 93, the distance between stopper 92 and staple unit 93 is the half length of the sheet. Staple unit 93 staples two points on the center of the sheet. After stapling by staple unit 93, stopper 92 moves down until a distance between pushing plate 95 and stopper 92 becomes the half length of the sheet. Then, pushing plate 95 pushes sheets to folding rollers 94 which are rotating. Pushing plate 95 is movable in a direction shown by arrow B. The sheet are folded by folding rollers 94 and discharged onto booklet tray 98.

When sheet folding is selected, a sheet is led to path 111 by flapper 110. The sheet is stopped by stopper 112 in order to fold the sheet by rollers 113 and 114. Stopper 112 is movable in a direction shown by arrow C. The distance between stopper 112 and rollers 113 and 114 is controlled in accordance with the length of the sheet and a way of folding. When Z-folding is conducted, the distance between stopper 112 and rollers 113 and 114 is the quarter length of the sheet.

The sheet is folded by rollers 113 and 114. Then, the sheet is stopped by stopper 116 in order to fold the sheet by rollers 114 and 115. Stopper 116 is movable in direction shown by arrow D. The distance between stopper 116 and rollers 114 and 115 is controlled in accordance with the length of the sheet and the way of folding. When Z-folding is conducted, the distance between stopper 116 and rollers 114 and 115 is the quarter length of the sheet. The sheet is folded by rollers 114 and 115 and then transported to roller 1.

Figure 14:
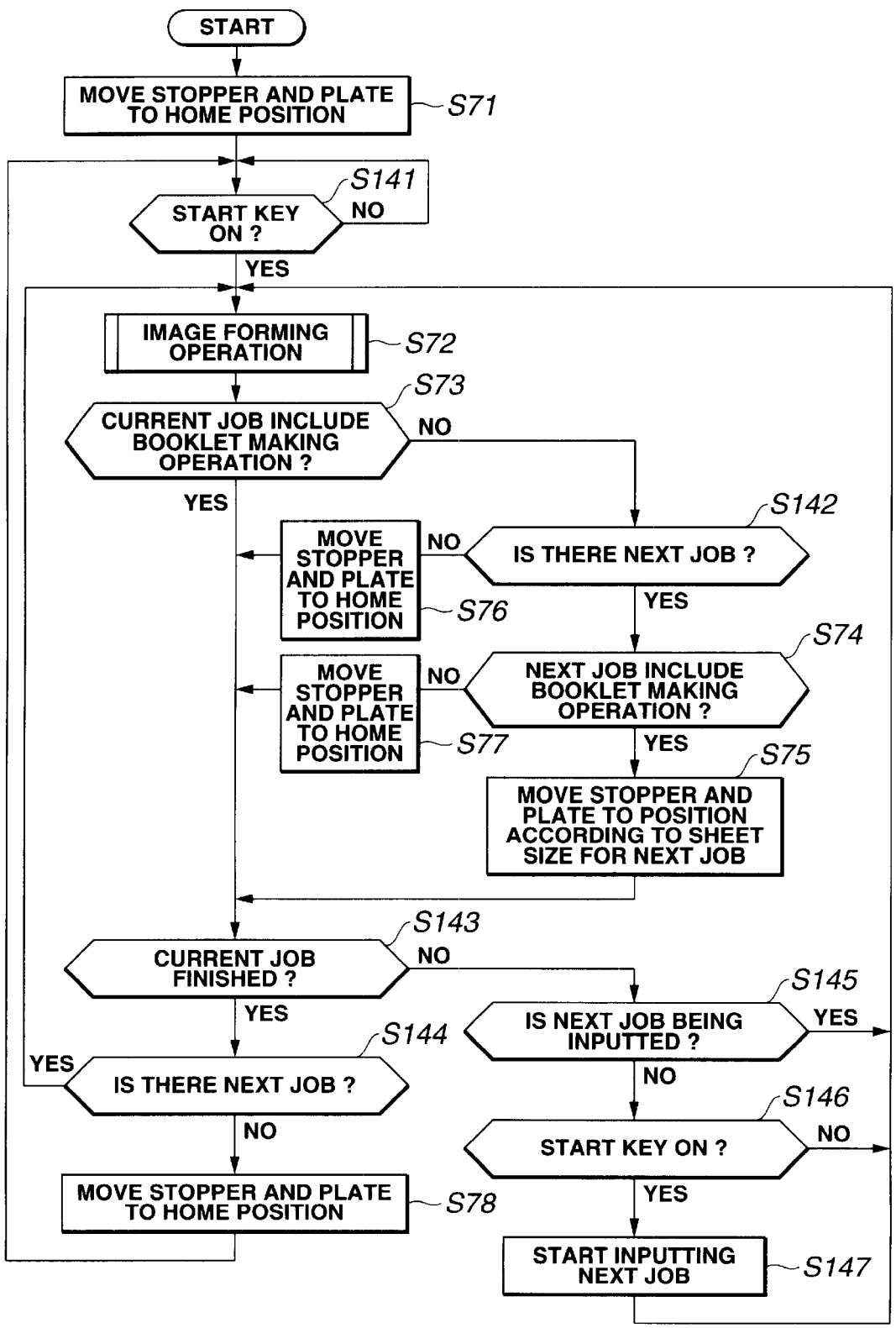
FIG. 14 is a flowchart showing a preparing operation regarding booklet making operation.

FIG. 14 shows a flowchart for conducting a preparing operation regarding booklet making operation. A program code of the flowchart is stored in ROM of memory 2001 and is conducted by CPU 2002.

As shown in FIG. 14, CPU 2002 instructs sheet processing controller 205 to move stopper 92 and aligning plate 97 to a home position (S71). Then, CPU 2002 checks if the start key of operation panel 40 is pressed by an user (S141). When the start key is pressed, CPU 2002 instructs to start an image forming operation (S72). Then, CPU 2002 discriminates if a current job includes a booklet making operation (S73). If the current job does not include the booklet making operation, CPU 2002 discriminates if there is a next job (S142). If there is a next job, CPU 2002 discriminates if the next job includes a booklet making operation (S74). If the next job includes the booklet making operation, CPU 2002 instructs sheet processing controller 205 to move stopper 92 and aligning plate 97 to a predetermined position according to a sheet size for the next job during the current job (S75). Then, CPU 2002 discriminates if the current job is finished (S143). In a case where stopper 92 and aligning plate 97 are not in the home position before executing step S75, CPU 2002 instructs sheet processing controller 205 to move stopper 92 and aligning plate 97 directly to the predetermined position from a current position without returning stopper 92 and aligning plate 97 to the home position.

If the current job includes the booklet making operation at step S73, CPU 2002 proceeds to step S143. If there is no next job at step S142 or if the next job does not include the booklet making operation at step S74, CPU 2002 instructs sheet processing controller 205 to move stopper 92 and aligning plate 97 to the home position (S76, S77) and proceeds to step S143.

If the current job is finished at step S143, CPU 2002 discriminates if there is a next job (S144). If there is a next job, CPU 2002 returns to step S72. If there is no next job at step S144, CPU 2002 instructs sheet processing controller 205 to move stopper 92 and aligning plate 97 to the home position (S78) and returns to step S141.

If the current job is not finished at step S143, CPU 2002 discriminates if a next job is being inputted, that is, documents of the next job are being read (S145). If a next job is being inputted, CPU 2002 returns to step S72. If a next job is not being inputted at step S145, CPU 2002 discriminates if the start key of operation panel 40 is pressed for inputting a next job (S146). If the start key is not pressed, CPU 2002 returns to step S72. If the start key is pressed at step S146, CPU 2002 instructs document reading controller 203 to start inputting documents of the next job (S147) and returns to step S72.

Figure 15:
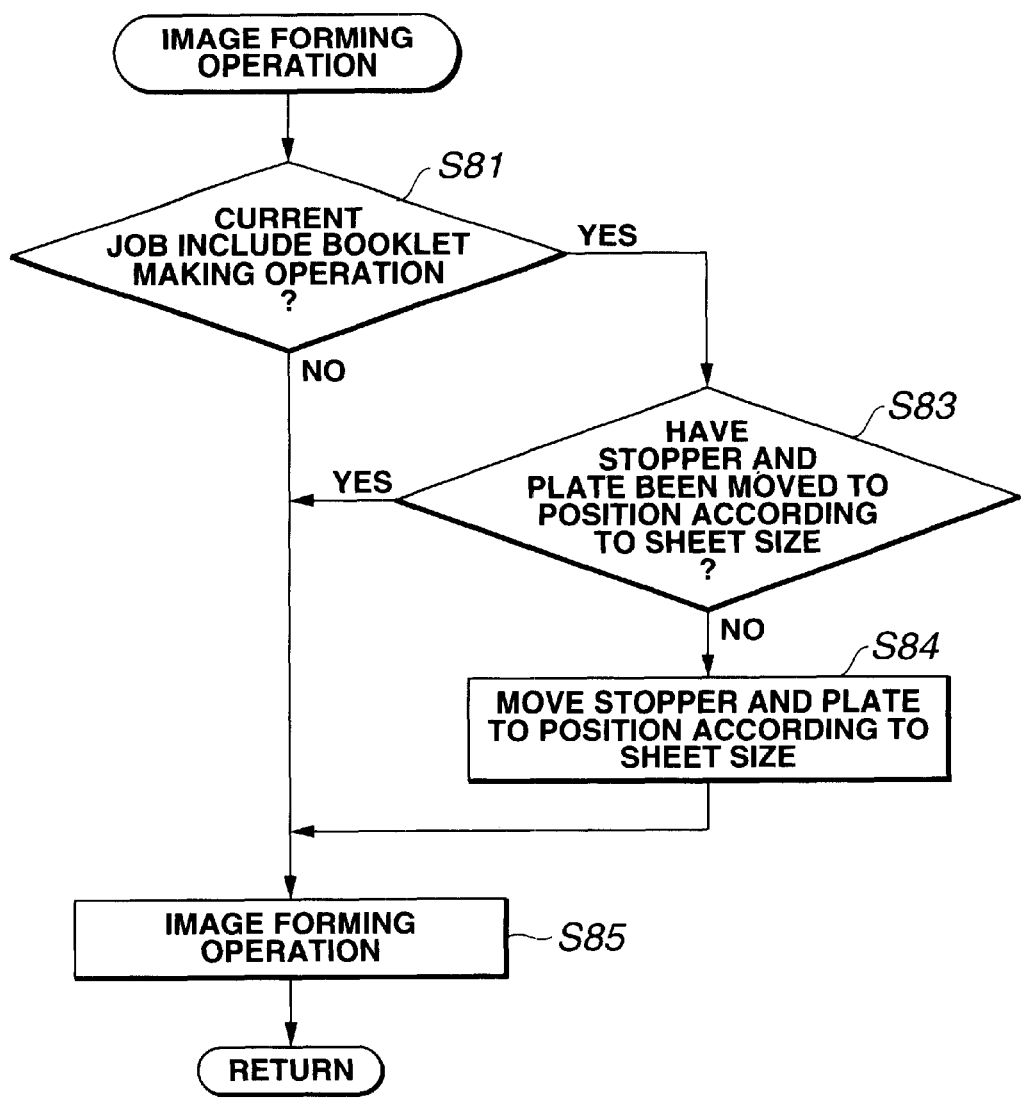
FIG. 15 is a flowchart showing the image forming operation shown in FIG. 14.

FIG. 15 shows a flowchart of a subroutine of the image forming operation at step S72. CPU 2002 discriminates if a current job includes a booklet making operation (S81). If the current job does not include a booklet making operation, CPU 2002 instructs image forming controller 204 to conduct an image forming operation (S85) and returns to the flowchart shown in FIG. 14. If the current job includes a booklet making operation at step S81, CPU 2002 discriminates if stopper 92 and aligning plate 97 have been moved to the predetermined position according to the sheet size for the current job (S83). If stopper 92 and aligning plate 97 have been moved to the predetermined position, CPU 2002 proceeds to step S85. If stopper 92 and aligning plate 97 have not been moved to the predetermined position, CPU 2002 instructs sheet processing controller 205 to move stopper 92 and aligning plate 97 to the predetermined position according to the sheet size (S84) and proceeds to step S85. In a case where stopper 92 and aligning plate 97 are not in the home position before executing step S84, CPU 2002 instructs sheet processing controller 205 to move stopper 92 and aligning plate 97 directly to the predetermined position from a current position without returning stopper 92 and aligning plate 97 to the home position.

Figure 16:
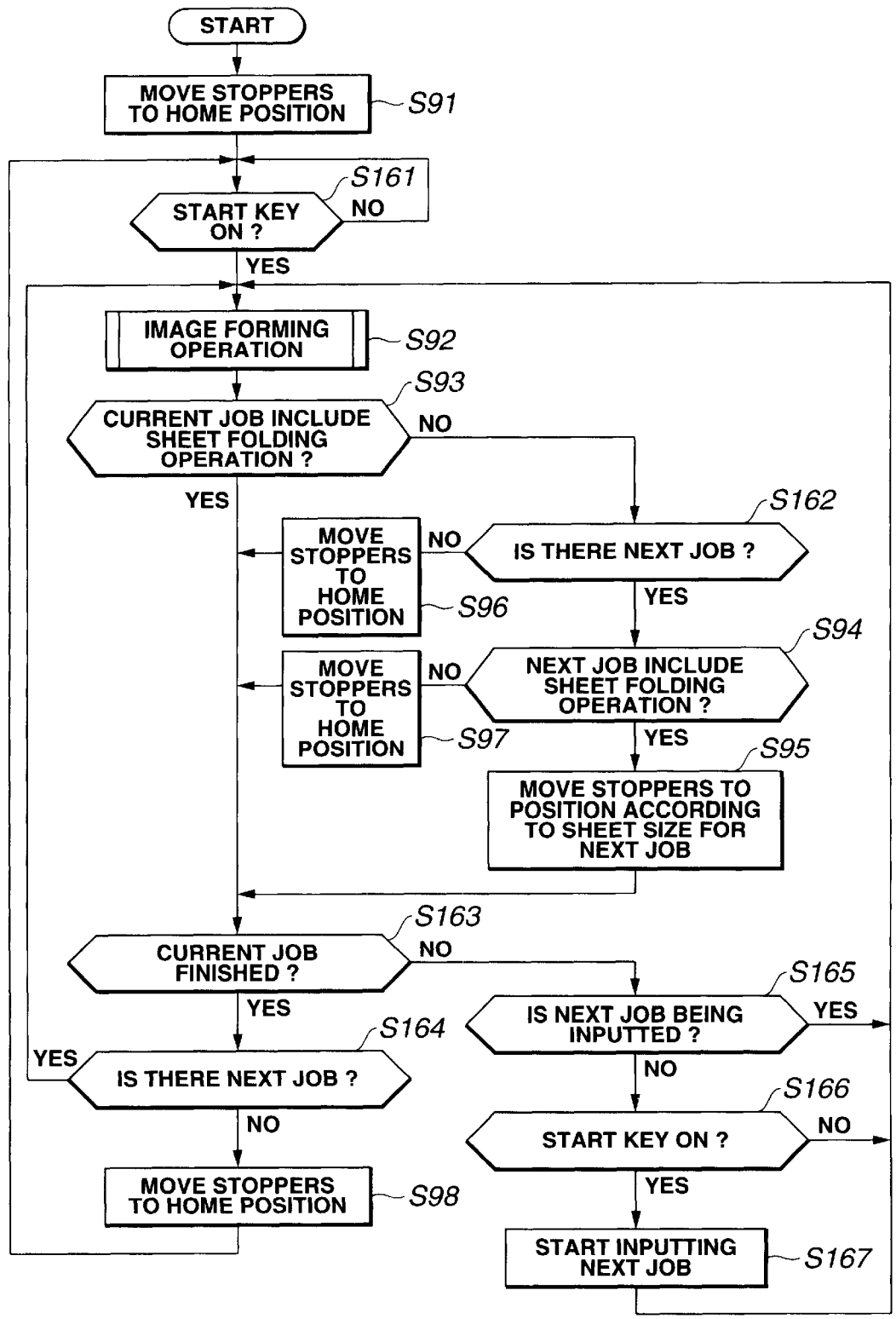
FIG. 16 is a flowchart showing a preparing operation regarding sheet folding operation.

FIG. 16 shows a flowchart for conducting a preparing operation regarding a sheet folding operation. A program code of the flowchart is stored in ROM of memory 2001 and is conducted by CPU 2002.

As shown in FIG. 16, CPU 2002 instructs sheet processing controller 205 to move stoppers 112 and 116 to a home position (S91). Then, CPU 2002 checks if the start key of operation panel 40 is pressed by a user (S161). When the start key is pressed, CPU 2002 instructs the start of an image forming operation (S92). Then, CPU 2002 discriminates if a current job includes a sheet folding operation (S93). If the current job does not include a sheet folding operation, CPU 2002 discriminates if there is a next job (S162). If there is a next job, CPU 2002 discriminates if the next job includes a sheet folding operation (S94). If the next job includes a sheet folding operation, CPU 2002 instructs sheet processing controller 205 to move stoppers 112 and 116 to a predetermined position according to a sheet size and a way of folding for the next job during the current job (S95). Then, CPU 2002 discriminates if the current job is finished (S163). In a case where stoppers 112 and 116 are not in the home position before executing step S75, CPU 2002 instructs sheet processing controller 205 to move stoppers 112 and 116 directly to the predetermined position from a current position without returning stoppers 112 and 116 to the home position.

If the current job includes a sheet folding operation at step S93, CPU 2002 proceeds to step S163. If there is no next job at step S162 or if the next job does not include a sheet folding operation at step S94, CPU 2002 instructs sheet processing controller 205 to move stoppers 112 and 116 to the home position (S96, S97) and proceeds to step S163.

If the current job is finished at step S163, CPU 2002 discriminates if there is a next job (S164). If there is a next job, CPU 2002 returns to step S92. If there is no next job at step S164, CPU 2002 instructs sheet processing controller 205 to move stoppers 112 and 116 to the home position (S98) and returns to step S161.

If the current job is not finished at step S163, CPU 2002 discriminates if a next job is being inputted, that is, documents of the next job are being read (S165). If a next job is being inputted, CPU 2002 returns to step S92. If a next job is not being inputted at step S165, CPU 2002 discriminates if the start key of operation panel 40 is pressed for inputting a next job (S166). If the start key is not pressed, CPU 2002 returns to step S92. If the start key is pressed at step S166, CPU 2002 instructs document reading controller 203 to start inputting documents of the next job (S167) and returns to step S92.

Figure 17:
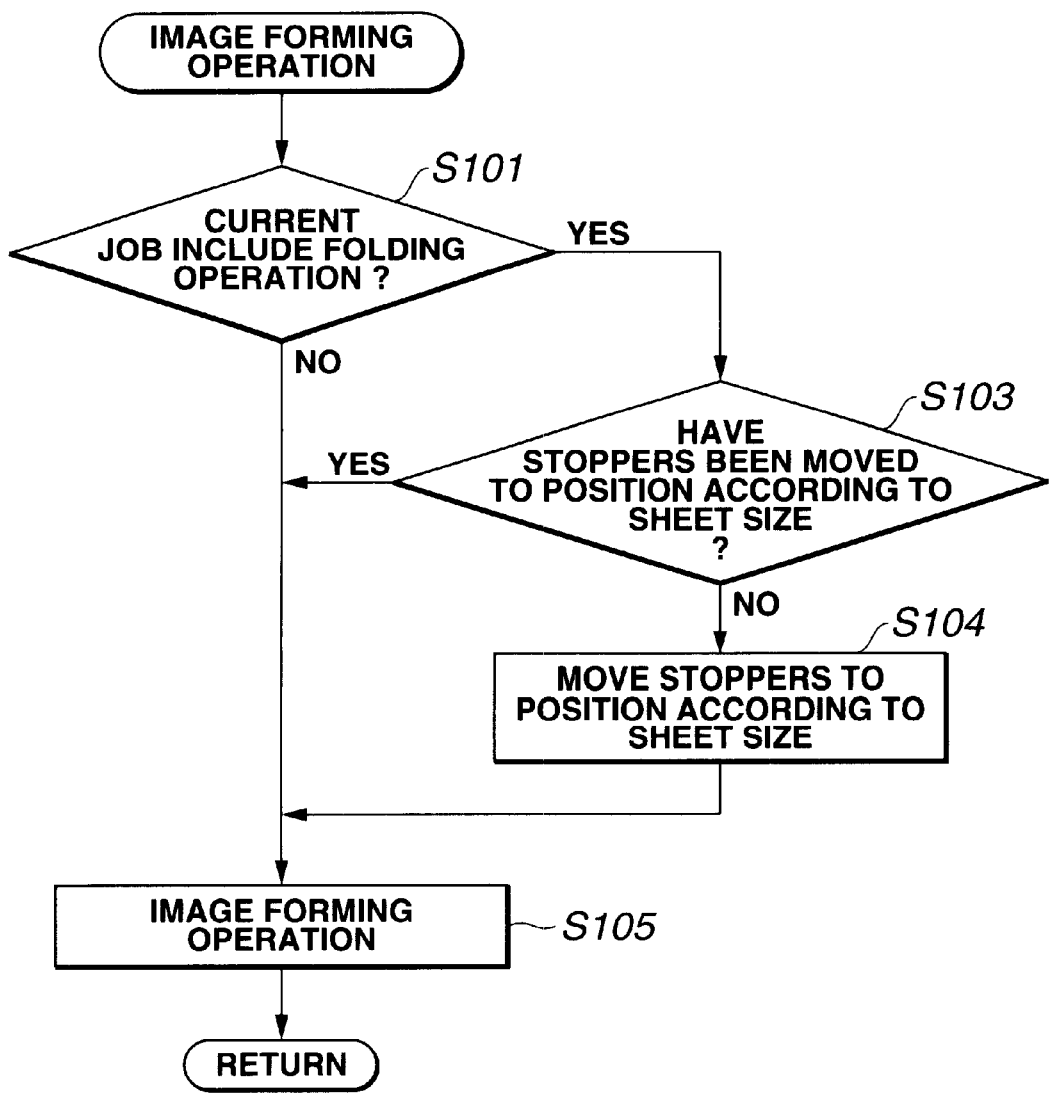
FIG. 17 is a flowchart showing the image forming operation shown in FIG. 16.
Figure 18A:
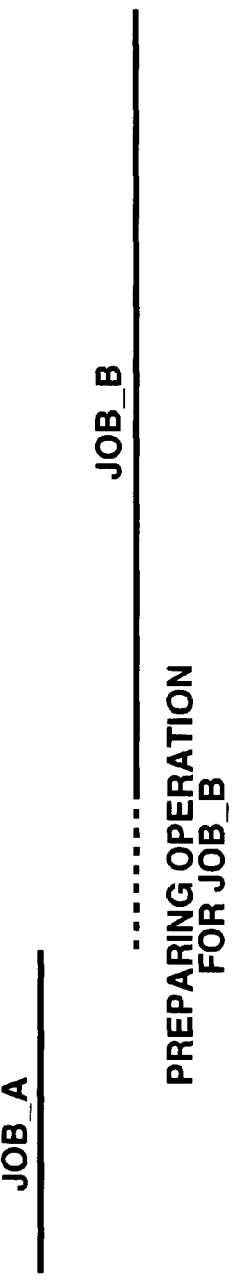
FIGS. 18A and 18B are diagrams of the preparing operation in the prior art.
Figure 18B:
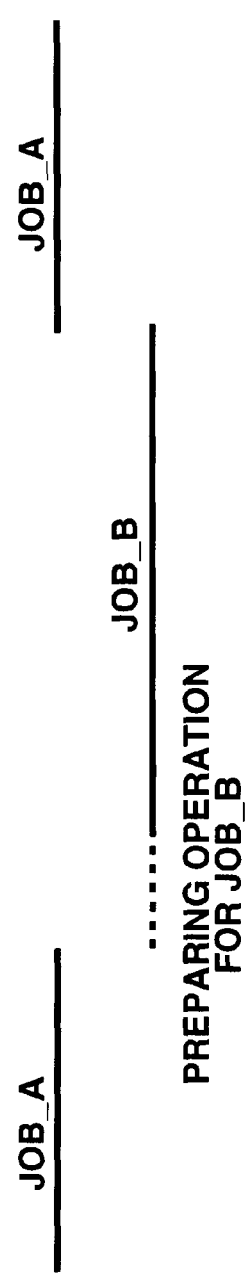

FIG. 17 shows a flowchart of a subroutine of the image forming operation at step S92. CPU 2002 discriminates if a current job includes a sheet folding operation (S101). If the current job does not include a sheet folding operation, CPU 2002 instructs image forming controller 204 to conduct an image forming operation (S105) and returns to the flowchart shown in FIG. 16. If the current job includes a sheet folding operation at step S101, CPU 2002 discriminates if stoppers 112 and 116 have been moved to the predetermined position according to the sheet size for the current job (S103). If stoppers 112 and 116 have been moved to the predetermined position, CPU 2002 proceeds to step S105. If stoppers 112 and 116 have not been moved to the predetermined position, CPU 2002 instructs sheet processing controller 205 to move stoppers 112 and 116 to the predetermined position according to the sheet size (S104) and proceeds to step S105. In a case where stoppers 112 and 116 are not in the home position before executing step S104, CPU 2002 instructs sheet processing controller 205 to move stoppers 112 and 116 directly to the predetermined position from a current position without returning stoppers 112 and 116 to the home position.

It is to be understood that the phraseology or terminology employed herein is for the purpose of description and not of limitation.

While the invention has been described with reference to the embodiment disclosed herein, it is not confined to the details set forth and this application is intended to cover such modifications or changes as may come within the purposes of the improvements or the scope of the following claims.

What is claimed is:

1. An image forming apparatus comprising:
   an input terminal for inputting image forming jobs including a first image forming job and a second image forming job subsequent to the first;
   an image forming unit for forming an image on a sheet in accordance with an image forming job inputted by said input terminal;
   a sheet processor for applying a sheet processing operation to a sheet in accordance with said image forming job inputted by said input terminal;
   a discriminator that determines whether the first image forming job includes a sheet processing operation that is included in the second image forming job; and
   a controller for instructing said sheet processor to conduct a preparing operation for a sheet processing operation of the second image forming job during the execution of the first image forming job if the discriminator determines that said first image forming job does not include said sheet processing operation that is included in the second image forming job.

2. An image forming apparatus according to claim 1, wherein said sheet processor includes a stapler for stapling sheets, and the preparing operation includes moving said stapler to a position according to a user designation.

3. An image forming apparatus according to claim 1, wherein said sheet processor includes a stapler for stapling sheets, and the preparing operation includes moving said stapler to a position according to a way of stapling.

4. An image forming apparatus according to claim 1, wherein said sheet processor includes a stapler for stapling sheets, and the preparing operation includes moving said stapler to a position according to a sheet size.

5. An image forming apparatus according to claim 1, wherein said sheet processor includes a puncher for punching a sheet, and said puncher includes a sensor for detecting a side edge of the sheet, and the preparing operation includes moving said sensor to a position according to a sheet width, and said discriminator determines whether the sheet width of the second image forming job is equal to or larger than the sheet width of the first image forming job.

6. An image forming apparatus according to claim 1, wherein said sheet processor includes a feeder for an insert sheet, and the preparing operation includes feeding an insert sheet to a predetermined position.

7. An image forming apparatus according to claim 1, wherein said sheet processor includes a booklet maker for making a booklet, and said booklet maker includes a stopper for stopping a sheet in order to bind sheets and fold sheets, and the preparing operation includes moving said stopper to a position according to a sheet size.

8. An image forming apparatus according to claim 1, wherein said sheet processor includes a booklet maker for making a booklet, and said booklet maker includes an aligner for aligning sheets, and the preparing operation includes moving said aligner to a position according to a sheet size.

9. An image forming apparatus according to claim 1, wherein said sheet processor includes a sheet folder for folding a sheet, and said sheet folder includes a stopper for stopping a sheet in order to fold the sheet, and the preparing operation includes moving said stopper to a position according to a sheet size.

10. An apparatus according to claim 1, wherein said input terminal includes a second input terminal for inputting image forming job from a document reader.

11. An apparatus according to claim 1, wherein said input terminal includes a second input terminal for inputting image forming job from an external unit.

12. An apparatus according to claim 1, wherein said input terminal includes a plurality of input terminals includes a first input terminal for inputting image forming job from a document reader and a second input terminal for inputting image forming job from an external unit, and said first image forming job and said second image forming job are inputted each of from different input terminal.

13. An apparatus according to claim 1, wherein said second image forming job includes an interrupt job.

14. An image forming apparatus connectable to a sheet processing apparatus which applies sheet processing operations to a sheet, said image forming apparatus comprising:
 an input terminal for inputting image forming jobs including a first image forming job and a second image forming job subsequent to the first;
 an image forming unit for forming an image on a sheet in accordance with an image forming job inputted by said input terminal;
 a discriminator that determines whether the first image forming job includes a sheet processing operation that is included in the second image forming job; and
 a controller for instructing said sheet processing apparatus to conduct a preparing operation for a sheet processing operation of the second image forming job during the execution of the first image forming job if the discriminator determines that said first image forming job does not include said sheet processing operation that is included in the second image forming job.

15. An image forming apparatus according to claim 14, wherein said sheet processing apparatus includes a stapler for stapling sheets, and the preparing operation includes moving said stapler to a position according to a user designation.

16. An image forming apparatus according to claim 14, wherein said sheet processing apparatus includes a stapler for stapling sheets, and the preparing operation includes moving said stapler to a position according to a way of stapling.

17. An image forming apparatus according to claim 14, wherein said sheet processing apparatus includes a stapler for stapling sheets, and the preparing operation includes moving said stapler to a position according to a sheet size.

18. An image forming apparatus according to claim 14, wherein said sheet processing apparatus includes a puncher for punching a sheet, and said puncher includes a sensor for detecting a side edge of the sheet, and the preparing operation includes moving said sensor to a position according to a sheet width, and said discriminator determines whether the sheet width of the second image forming job is equal to or larger than the sheet width of the first image forming job.

19. An image forming apparatus according to claim 14, wherein said sheet processing apparatus includes a feeder for an insert sheet, and the preparing operation includes feeding an insert sheet to a predetermined position.

20. An image forming apparatus according to claim 14, wherein said sheet processing apparatus includes a booklet maker for making a booklet, and said booklet maker includes a stopper for stopping a sheet in order to bind sheets and fold sheets, and the preparing operation includes moving said stopper to a position according to a sheet size.

21. An image forming apparatus according to claim 14, wherein said sheet processing apparatus includes a booklet maker for making a booklet, and said booklet maker includes an aligner for aligning sheets, and the preparing operation includes moving said aligner to a position according to a sheet size.

22. An image forming apparatus according to claim 14, wherein said sheet processing apparatus includes a sheet folder for folding a sheet, and said sheet folder includes a stopper for stopping a sheet in order to fold the sheet, and the preparing operation includes moving said stopper to a position according to a sheet size.

23. An apparatus according to claim 14, wherein said input terminal includes a first input terminal for inputting image forming job from a document reader.

24. An apparatus according to claim 14, wherein said input terminal includes a second input terminal for inputting image forming job from an external unit.

25. An apparatus according to claim 14, wherein said input terminal includes a plurality of input terminals includes a first input terminal for inputting image forming job from a document reader and a second input terminal for inputting image forming job from an external unit, and said first image forming job and said second image forming job are inputted each of from different input terminal.

26. A method according to claim 14, wherein said second image forming job includes an interrupt job.

27. A method for controlling an image forming apparatus connected to a sheet processing apparatus which applies one or more sheet processing to a sheet from said image forming apparatus, said method comprising:
 inputting a first image forming job;
 inputting a second image forming job;
 conducting the first image forming job;
 determining whether the first image forming job includes a sheet processing operation that is included in the second image forming job;
 instructing said sheet processing apparatus to conduct a preparing operation for said sheet processing operation of the second image forming job during said conducting step of the first image forming job if the discriminator determines that said first image forming job does not include said sheet processing operation that is included in the second image forming job; and
 conducting the second image forming job.

28. A method according to claim 27, wherein said sheet processing apparatus includes a stapler for stapling sheets, and the preparing operation includes moving said stapler to a position according to a user designation.

29. A method according to claim 27, wherein said sheet processing apparatus includes a stapler for stapling sheets, and the preparing operation includes moving said stapler to a position according to a way of stapling.

30. A method according to claim 27, wherein said sheet processing apparatus includes a stapler for stapling sheets, and the preparing operation includes moving said stapler to a position according to a sheet size.

31. A method according to claim 27, wherein said sheet processing apparatus includes a puncher for punching a sheet, and said puncher includes a sensor for detecting a side edge of the sheet, and the preparing operation includes moving said sensor to a position according to a sheet width, and said discriminator determines whether the sheet width of the second image forming job is equal to or larger than the sheet width of the first image forming job.

32. A method according to claim 27, wherein said sheet processing apparatus includes a feeder for an insert sheet, and the preparing operation includes feeding an insert sheet to a predetermined position.

33. A method according to claim 27, wherein said sheet processing apparatus includes a booklet maker for making a booklet, and said booklet maker includes a stopper for stopping a sheet in order to bind sheets and fold sheets, and the preparing operation includes moving said stopper to a position according to a sheet size.

34. A method according to claim 27, wherein said sheet processing apparatus includes a booklet maker for making a booklet, and said booklet maker includes an aligner for aligning sheets, and the preparing operation includes moving said aligner to a position according to a sheet size.

35. A method according to claim 27, wherein said sheet processing apparatus includes a sheet folder for folding a sheet, and said sheet folder includes a stopper for stopping a sheet in order to fold the sheet, and the preparing operation includes moving said stopper to a position according to a sheet size.

36. A recording medium, which includes code for process steps that can be read by a controller of an image forming apparatus connected to a sheet processing apparatus which applies one or more sheet processing operations to a sheet from said image forming apparatus, said code comprising:

code for inputting a first image forming job;

code for inputting a second image forming job;

code for conducting the first image forming job;

code for determining whether the first image forming job includes a sheet processing operation that is included in the second image forming job;

code for instructing said sheet processing apparatus to conduct a preparing operation for the sheet processing of the second image forming job during the execution of the first image forming job if the discriminator determines that said first image forming job does not include said sheet processing operation that is included in the second image forming job; and code for conducting the second image forming job.

37. A recording medium according to claim 36, wherein said sheet processing apparatus includes a stapler for stapling sheets, and the preparing operation includes moving said stapler to a position according to a user designation.

38. A recording medium according to claim 36, wherein said sheet processing apparatus includes a stapler for stapling sheets, and the preparing operation includes moving said stapler to a position according to a way of stapling.

39. A recording medium according to claim 36, wherein said sheet processing apparatus includes a stapler for stapling sheets, and the preparing operation includes moving said stapler to a position according to a sheet size.

40. A recording medium according to claim 36, wherein said sheet processing apparatus includes a puncher for punching a sheet, and said puncher includes a sensor for detecting a side edge of the sheet, and the preparing operation includes moving said sensor to a position according to a sheet width, and said code determines whether the sheet width of the second image forming job is equal to or larger than a sheet width of the first image forming job.

41. A recording medium according to claim 36, wherein said sheet processing apparatus includes a feeder for an insert sheet, and the preparing operation includes feeding an insert sheet to a predetermined position.

42. A recording medium according to claim 36, wherein said sheet processing apparatus includes a booklet maker for making a booklet, and said booklet maker includes a stopper for stopping a sheet in order to bind sheets and fold sheets, and the preparing operation includes moving said stopper to a position according to a sheet size.

43. A recording medium according to claim 36, wherein said sheet processing apparatus includes a booklet maker for making a booklet, and said booklet maker includes an aligner for aligning sheets, and the preparing operation includes moving said aligner to a position according to a sheet size.

44. A recording medium according to claim 36, wherein said sheet processing apparatus includes a sheet folder for folding a sheet, and said sheet folder includes a stopper for stopping a sheet in order to fold the sheet, and the preparing operation includes moving said stopper to a position according to a sheet size.

45. A computer program, which includes code for process steps that can be conducted by a controller of an image forming apparatus connected to a sheet processing apparatus which applies one or more sheet processing to a sheet from said image forming apparatus, said code comprising:

code for inputting a first image forming job;

code for inputting a second image forming job;

code for conducting the first image forming job;

code for determining whether the first image forming job includes a sheet processing operation that is included in the second image forming job;

code for instructing said sheet processing apparatus to conduct a preparing operation for a sheet processing operation of the second image forming job during the execution of the first image forming job if the discriminator determines that said first image forming job does not include said sheet processing operation that is included in the second image forming job; and code for conducting the second image forming job.

46. A computer program according to claim 45, wherein said sheet processing apparatus includes a stapler for stapling sheets, and the preparing operation includes moving said stapler to a position according to a user designation.

47. A computer program according to claim 45, wherein said sheet processing apparatus includes a stapler for stapling sheets, and the preparing operation includes moving said stapler to a position according to a way of stapling.

48. A computer program according to claim 45, wherein said sheet processing apparatus includes a stapler for stapling sheets, and the preparing operation includes moving said stapler to a position according to a sheet size.

49. A computer program according to claim 45, wherein said sheet processing apparatus includes a puncher for punching a sheet, and said puncher includes a sensor for detecting a side edge of the sheet, and the preparing operation includes moving said sensor to a position according to a sheet width, and said code determines whether the sheet width of the second image forming job is equal to or larger than a sheet width of the first image forming job.

50. A computer program according to claim 45, wherein said sheet processing apparatus includes a feeder for an insert sheet, and the preparing operation includes feeding an insert sheet to a predetermined position.

51. A computer program according to claim 45, wherein said sheet processing apparatus includes a booklet maker for making a booklet, and said booklet maker includes a stopper for stopping a sheet in order to bind sheets and fold sheets, and the preparing operation includes moving said stopper to a position according to a sheet size.

52. A computer program according to claim 45, wherein said sheet processing apparatus includes a booklet maker for making a booklet, and said booklet maker includes an aligner for aligning sheets, and the preparing operation includes moving said aligner to a position according to a sheet size.

53. A computer program according to claim 45, wherein said sheet processing apparatus includes a sheet folder for folding a sheet, and said sheet folder includes a stopper for stopping a sheet in order to fold the sheet, and the preparing operation includes moving said stopper to a position according to a sheet size.

54. A method for controlling an image forming system having a sheet processing apparatus which applies a sheet processing to a sheet from an image forming apparatus which has an input terminal for inputting image forming jobs including a first image forming job and a second image forming job subsequent to the first and an image forming unit for forming an image on a sheet in accordance with an image forming job inputted by said input terminal, said method comprising:

inhibiting to execute a preparing operation for a sheet processing operation of the second image forming job in parallel with a process of said first image forming job in case that said first image forming job includes said sheet processing operation that is included in the second image forming job; and allowing to execute a preparing operation for a sheet processing operation of the second image forming job in parallel with a process of said first image forming job in case that said first image forming job does not include said sheet processing operation that is included in the second image forming job.

55. A method according to claim 54, wherein said sheet processing apparatus includes a stapler for stapling sheets, and the preparing operation includes moving said stapler to a position according to a user designation.

56. A method according to claim 54, wherein said sheet processing apparatus includes a stapler for stapling sheets, and the preparing operation includes moving said stapler to a position according to a way of stapling.

57. A method according to claim 54, wherein said sheet processing apparatus includes a stapler for stapling sheets, and the preparing operation includes moving said stapler to a position according to a sheet size.

58. A method according to claim 54, wherein said sheet processing apparatus includes a puncher for punching a sheet, and said puncher includes a sensor for detecting a side edge of the sheet, and the preparing operation includes moving said sensor to a position according to a sheet width, and said step includes a step of inhibiting to execute said preparing operation for a sheet processing operation of the second image forming job in parallel with a process of said first image forming job in case that the sheet width of the second image forming job is not equal to or larger than the sheet with of the first image forming job and a step of allowing to execute said preparing operation for a sheet processing operation of the second image forming job in parallel with a process of said first image forming job in case that the sheet width of the second image forming job is equal to or larger than the sheet with of the first image forming job.

59. A method according to claim 54, wherein said sheet processing apparatus includes a feeder for an insert sheet, and the preparing operation includes feeding an insert sheet to a predetermined position.

60. A method according to claim 54, wherein said sheet processing apparatus includes a booklet maker for making a booklet, and said booklet maker includes a stopper for stopping a sheet in order to bind sheets and fold sheets, and the preparing operation includes moving said stopper to a position according to a sheet size.

61. A method according to claim 54, wherein said sheet processing apparatus includes a booklet maker for making a booklet, and said booklet maker includes an aligner for aligning sheets, and the preparing operation includes moving said aligner to a position according to a sheet size.

62. A method according to claim 54, wherein said sheet processing apparatus includes a sheet folder for folding a sheet, and said sheet folder includes a stopper for stopping a sheet in order to fold the sheet, and the preparing operation includes moving said stopper to a position according to a sheet size.

63. A method according to claim 54, wherein said input terminal includes a first input terminal for inputting image forming job from a document reader.

64. A method according to claim 54, wherein said input terminal includes a second input terminal for inputting image forming job from an external unit.

65. A method according to claim 54, wherein said input terminal includes a plurality of input terminals includes a first input terminal for inputting image forming job from a document reader and a second input terminal for inputting image forming job from an external unit, and said first image forming job and said second image forming job are inputted each of from different input terminal.

66. A method according to claim 54, wherein said second image forming job includes an interrupt job.

67. A controller for controlling an image forming system having a sheet processing apparatus which applies a sheet processing to a sheet from an image forming apparatus which has an input terminal for inputting image forming jobs including a first image forming job and a second image forming job subsequent to the first and an image forming unit for forming an image on a sheet in accordance with an image forming job inputted by said input terminal, said method comprising:

control means for inhibiting to execute a preparing operation for a sheet processing operation of the second image forming job in parallel with a process of said first image forming job in case that said first image forming job includes said sheet processing operation that is included in the second image forming job and allowing to execute a preparing operation for a sheet processing operation of the second image forming job in parallel with a process of said first image forming job in case that said first image forming job does not include said sheet processing operation that is included in the second image forming job.

68. A controller according to claim 67, wherein said sheet processing apparatus includes a stapler for stapling sheets, and the preparing operation includes moving said stapler to a position according to a user designation.

69. A controller according to claim 67, wherein said sheet processing apparatus includes a stapler for stapling sheets, and the preparing operation includes moving said stapler to a position according to a way of stapling.

70. A controller according to claim 67, wherein said sheet processing apparatus includes a stapler for stapling sheets, and the preparing operation includes moving said stapler to a position according to a sheet size.

71. A controller according to claim 67, wherein said sheet processing apparatus includes a pucker for punching a sheet, and said puncher includes a sensor for detecting a side edge of the sheet, and the preparing operation includes moving said sensor to a position according to a sheet width, and said step includes a step of inhibiting to execute said preparing operation for a sheet processing operation of the second image forming job in parallel with a process of said first image forming job in case that the sheet width of the second image forming job is not equal to or larger than the sheet with of the first image forming job and a step of allowing to execute said preparing operation for a sheet processing operation of the second image forming job in parallel with a process of said first image forming job in case that the sheet width of the second image forming job is equal to or larger than the sheet with of the first image forming job.

72. A controller according to claim 67, wherein said sheet processing apparatus includes a feeder for an insert sheet, and the preparing operation includes feeding an insert sheet to a predetermined position.

73. A controller according to claim 67, wherein said sheet processing apparatus includes a booklet maker for making a booklet, and said booklet maker includes a stopper for stopping a sheet in order to bind sheets and fold sheets, and the preparing operation includes moving said stopper to a position according to a sheet size.

74. A controller according to claim 67, wherein said sheet processing apparatus includes a booklet maker for making a booklet, and said booklet maker includes an aligner for aligning sheets, and the preparing operation includes moving said aligner to a position according to a sheet size.

75. A controller according to claim 67, wherein said sheet processing apparatus includes a sheet folder for folding a sheet, and said sheet folder includes a stopper for stopping a sheet in order to fold the sheet, and the preparing operation includes moving said stopper to a position according to a sheet size.

76. A controller according to claim 67, wherein said input terminal includes a first input terminal for inputting image forming job from a document reader.

77. A controller according to claim 67, wherein said input terminal includes a second input terminal for inputting image forming job from an external unit.

78. A controller according to claim 67, wherein said input terminal includes a plurality of input terminals includes a first input terminal for inputting image forming job from a document reader and a second input terminal for inputting image forming job from an external unit, and said first image forming job and said second image forming job are inputted each of from different input terminal.

79. A controller according to claim 67, wherein said second image forming job includes an interrupt job.

* * * * *

UNITED STATES PATENT AND TRADEMARK OFFICE
CERTIFICATE OF CORRECTION

PATENT NO. : 6,430,382 B1
DATED : August 6, 2002
INVENTOR(S) : Kiyoshi Okamoto et al.

It is certified that error appears in the above-identified patent and that said Letters Patent is hereby corrected as shown below:

<u>Title page,</u>
Item [57], ABSTRACT,
Line 14, "he" should read -- the --.

<u>Column 1,</u>
Line 7, "relates to control" should read -- relates to a control --.

<u>Column 2,</u>
Line 23, "a" should be deleted.

<u>Column 8,</u>
Line 14, "proceeds" should read -- proceeds to --.

<u>Column 15,</u>
Line 30, "terminals includes" should read -- terminals, including --; and
Line 35, "terminal." should read -- terminals. --.

<u>Column 16,</u>
Line 41, "terminals" should read -- terminals, --;
Line 42, "includes" should read -- including --; and
Line 46, "terminal." should read -- terminals. --.

<u>Column 20,</u>
Line 7, "with" should read -- width --;
Line 12, "with" should read -- width --;
Line 41, "terminals includes" should read -- terminals, including --; and
Line 46, "terminal." should read -- terminals. --.

<u>Column 21,</u>
Line 16, "pucker" should read -- puncher --;
Line 25, "with" should read -- width --; and
Line 30, "with" should read -- width --.

UNITED STATES PATENT AND TRADEMARK OFFICE
CERTIFICATE OF CORRECTION

PATENT NO. : 6,430,382 B1
DATED : August 6, 2002
INVENTOR(S) : Kiyoshi Okamoto et al.

It is certified that error appears in the above-identified patent and that said Letters Patent is hereby corrected as shown below:

Column 22,
Line 25, "terminals includes" should read -- terminals, including --; and
Line 30, "terminal." should read -- terminals. --.

Signed and Sealed this

Twenty-fifth Day of February, 2003

JAMES E. ROGAN
*Director of the United States Patent and Trademark Office*